(12) United States Patent
Grunspan et al.

(10) Patent No.: US 7,676,391 B1
(45) Date of Patent: Mar. 9, 2010

(54) RESOURCE-BASED CAPACITY SCHEDULING SYSTEM

(75) Inventors: Dan Grunspan, Bellevue, WA (US); Ehud Pardo, Bellevue, WA (US); Derik Stenerson, Redmond, WA (US); Tobin Zerba, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1432 days.

(21) Appl. No.: 10/609,991

(22) Filed: Jun. 30, 2003

(51) Int. Cl.
*G06Q 10/00* (2006.01)
(52) U.S. Cl. ......................................................... 705/8
(58) Field of Classification Search ...................... 705/8
See application file for complete search history.

(56) References Cited

U.S. PATENT DOCUMENTS

| | | | | | |
|---|---|---|---|---|---|
| 5,615,121 | A | * | 3/1997 | Babayev et al. | 705/9 |
| 5,970,466 | A | * | 10/1999 | Detjen et al. | 705/8 |
| 7,174,303 | B2 | * | 2/2007 | Glazer et al. | 705/9 |
| 7,359,864 | B2 | * | 4/2008 | Carlson et al. | 705/9 |
| 2001/0027481 | A1 | * | 10/2001 | Whyel | 709/218 |
| 2002/0032588 | A1 | * | 3/2002 | Glazer et al. | 705/6 |
| 2002/0035493 | A1 | * | 3/2002 | Mozayeny et al. | 705/5 |
| 2004/0114514 | A1 | * | 6/2004 | Ghosal et al. | 370/230 |
| 2004/0158568 | A1 | * | 8/2004 | Colle et al. | 707/100 |
| 2007/0208604 | A1 | * | 9/2007 | Purohit et al. | 705/9 |

OTHER PUBLICATIONS

Isken, Mark W., and Timothy J. Ward. "Simulating Outpatient Obstetrical Clinics." Proceedings of the 1999 Winter Simulation Conference (1999). pp. 1557-1563.*

Hannebauer, Markus, and Sebastian Muller. "Distributed Constraint Optimization for Medical Appointment Scheduling." Proceedings of the Fifth International Conference on Autonomous Agents (2001). pp. 139-140.*

Manansang, Hans. "An Online, Simulation-Based Patient Scheduling System." Proceedings of the 1996 Winter Simulation Conference: 1996. pp. 1170-1175.*

Schilling, G. and C.C. Pantelides. "A Simple Continuous-Time Process Scheduling Formulation and a Novel Solution Algorithm." Computers Chemical Engineering: vol. 20 (1996). pp. S1221-S1226.*

* cited by examiner

*Primary Examiner*—Beth V Boswell
*Assistant Examiner*—Neil R Kardos
(74) *Attorney, Agent, or Firm*—Westman, Champlin & Kelly, P.A.

(57) ABSTRACT

The present invention describes the scheduling requirements if a business to an automatic scheduling system in a way which allows efficient automatic scheduling of appointments for resources of the business. In one embodiment, the scheduling system schedules the resources based not only on total capacity, but based on how many appointments can be initiated at a given time.

10 Claims, 28 Drawing Sheets

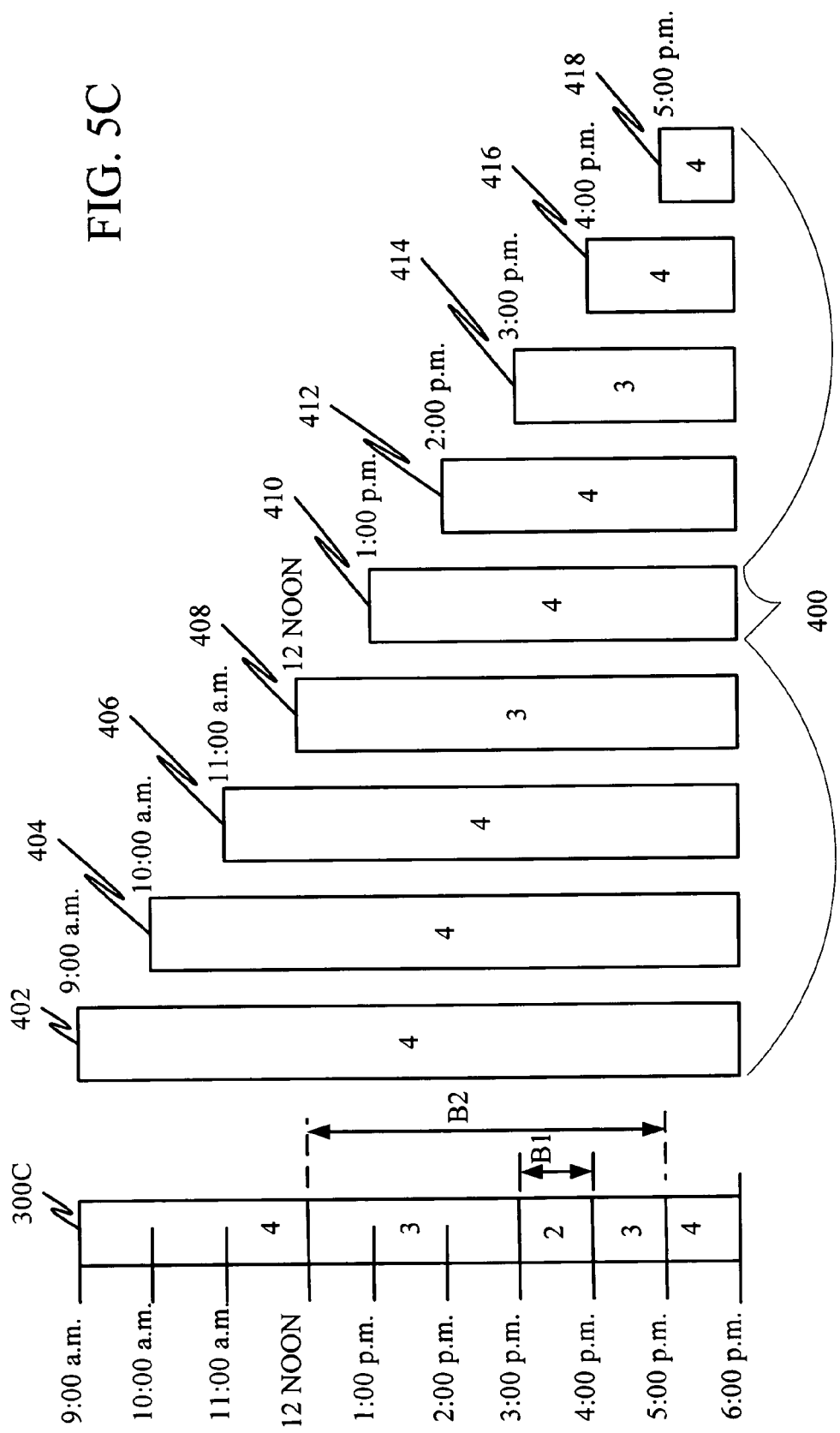

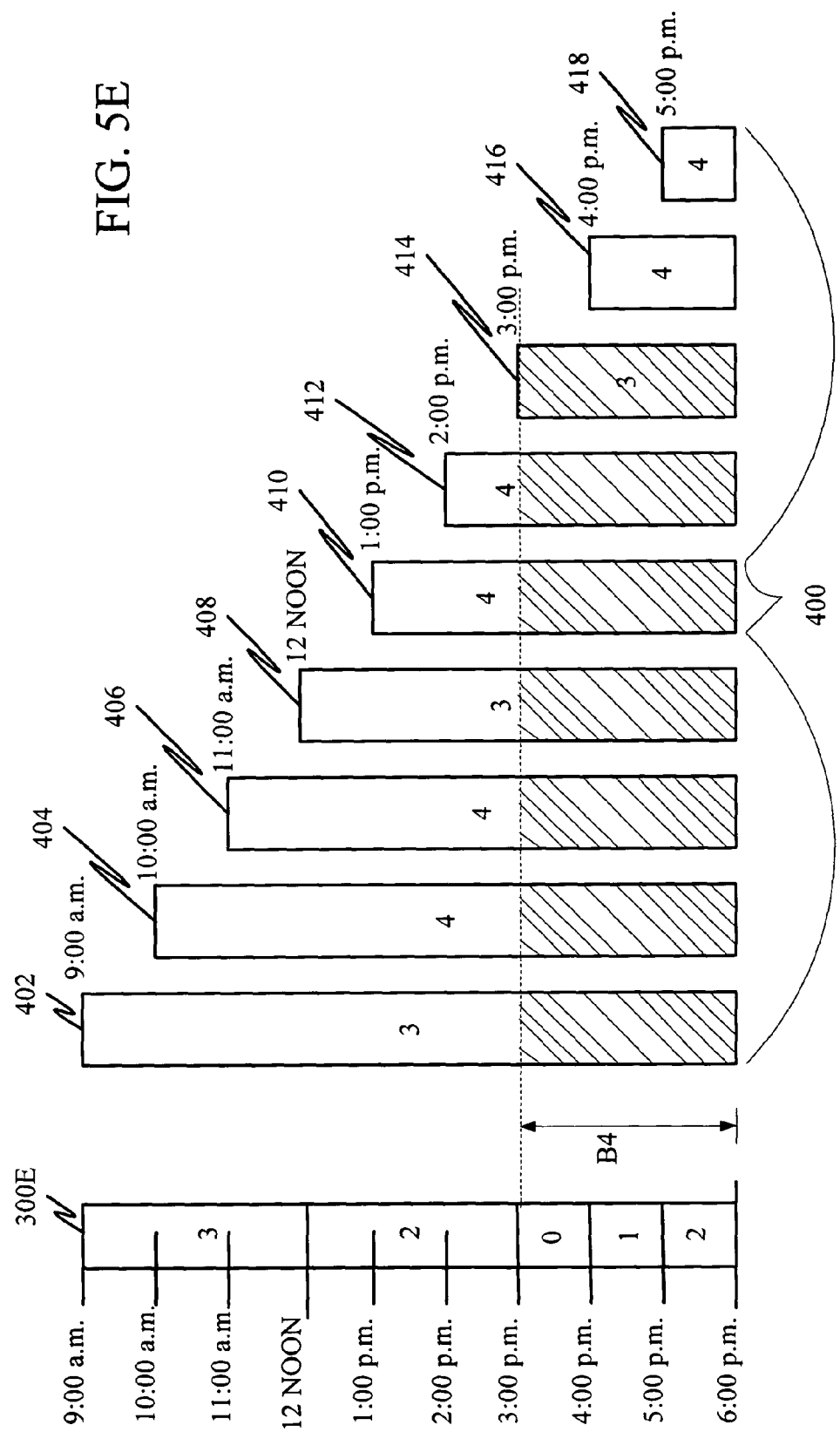

Example #1: Same Customer and Provider Duration, Appt. Length Doesn't Vary

FIG. 6A

Length of appointment

Enter the time reserved for this appointment for the customer and for the person providing the service. The start time is the same for both.

☑ Appointment length is the same for the customer and the provider.
☑ Appointment length can vary

|  | For customer | For provider |  |
|---|---|---|---|
| Appointment lengths: | 60 minutes | 60 minutes | Remove |
|  | 60 minutes | 60 minutes | Remove |
|  | Add Alternate Length | | |

FIG. 6B

Home | Appointments | Customers | Tools | Settings

Settings > Resources

Resource

Enter information and select which services, if any, the resource performs.

Resource information

Display name: 
Description:

Supported services

☐ Apheresis Donation
☐ Blood Donation
☐ Bone Marrow Donation
☐ Consultation
☐ Evaluation Save and Close    Cancel

FIG. 7

| | | | |
|---|---|---|---|
| Home \| Appointments \| Customers \| Tools | Settings | | |

Settings > Resource Detail > 1 & 2 Union Square > Schedules

Schedules for [1 & 2 Union Square]

To create a new Weekly Schedule, select "NEW..." from the dropdown.

Edit Schedules

Regular Weekly Schedules

| Weekday | Schedule | Hours | Start appts. every |
|---|---|---|---|
| Sunday | Closed | Closed | |
| Monday | Weekday | 9:00AM - 7:00PM | 15 min. |
| Tuesday | Late Start Drive | 11:00AM - 4:00PM | 15 min. |
| Wednesday | Weekday | 9:00AM - 7:00PM | 15 min. |
| Thursday | Weekday | 9:00AM - 7:00PM | 15 min. |
| Friday | Late Start Drive | 11:00AM - 4:00PM | 15 min. |
| Saturday | Weekend | 1:00PM - 5:00PM | 15 min. |

Exceptions

[ Exceptions ]

| Date | Schedule | Hours | Start appts. every |
|---|---|---|---|
| Fri Aug 30, 2002 | Weekend | 1:00PM - 5:00 PM | 15 min. |
| Mon Sep 2, 2002 | Closed | Closed | |
| Tue Sep 3, 2002 | Early Start | 7:00AM - 3:00PM | 15 min |

FIG. 8

| | |
|---|---|
| Home \| Appointments \| Customers \| Tools | Settings |

Settings > Resource Detail > 1 & 2 Union Square > Schedules > Late Start Drive

1 & 2 Union Square's Late Start Drive Schedule

Set up and edit this schedule.                    [ Done ]

This schedule currently applies to: Mondays, Tuesdays, Wednesdays, Fridays, Sat Sep 7 2002, and Sun Sep 8 2002.

Working Hours

| | | |
|---|---|---|
| Schedule: | 10:00 AM - 4:00 PM | [ Edit ] |
| Appts start every: | 15 minutes. | |
| Schedule type: | Capacity | |

[ Add Service ]  [ Add Group ]

| Services Performed | Initial capacity | | |
|---|---|---|---|
| Apheresis (Group) | 2 appts from group | [ Edit ] | [ Remove ] |
| Blood Donation | 3 appts | [ Edit ] | [ Remove ] |

[ Add Break ]  [ Edit Timetable ]

Schedule

*layout described in the text of the spec...*

[ Done ]

FIG. 9

- Schedule section:
  o If no services have been added, then display "No scheduled services."
  o "Add Break" moved outside the box, invokes the existing Add Break UI.
  o "Edit Timetable" invokes new capacity timetable UI as described in Edit Timetables (new? / updateTemplate.asp).
  o Clarify "Schedule" Timetable Summary information so it is clear what the "potential" or "planned" schedule looks like. You can think of it as a condensed version of a fully booked Daily Schedule page.
    - At first the schedule looks simple:

| 8:00AM - 5:00PM | up to 4 at a time for Service1 |
    | 8:00AM - 5:00PM | up to 2 at a time for Service2, Group2 |

- Then perhaps they create some ranges:

| 8:00AM - 12:00PM | up to 4 at a time for Service1 |
    | 8:00AM - 11:00AM | up to 2 at a time for Service2, Group2 |
    | 12:00PM - 5:00PM | up to 3 at a time for Service1 |

- Then perhaps they add some start time restrictions (at 8, 9, 11)

Capacity Ranges:
    | 8:00AM - 12:00PM | up to 4 at a time for Service1 |
    | 8:00AM - 11:00AM | up to 2 at a time for Service2, Group2 |
    | 12:00PM - 5:00PM | up to 3 at a time for Service1 |

Start Time Restrictions:
    | 8:00AM | start at most 1 for Group2 |
    | 9:00 AM | start at most 3 for Service 1 |
    | 11:00 AM | start at most 3 for Service 1 |

FIG. 10

| Home | Appointments | Customers | Tools | Settings |

Settings > Resource Detail > 1 & 2 Union Square > Schedules > Late Start Drive

1 & 2 Union Square's Late Start Drive Schedule

Set up and edit this schedule. [ Done ]

This schedule currently applies to: Mondays, Tuesdays, Wednesdays, Fridays, Sat Sep 7 2002, and Sun Sep 8 2002.

Working Hours

| | | |
|---|---|---|
| Schedule: | 10:00 AM - 4:00 PM | [ Edit ] |
| Appts. start every: | 15 minutes. | |
| Schedule type: | Standard | |

Services Performed

Select the services that 1 & 2 Union Square performs on this day. To restrict the hours of the day in which the service can be performed, click Edit Timetable.

| Supported Services | Scheduled times | |
|---|---|---|
| ☑ Apheresis Donation | Non-restricted | [ Edit Timetable ] |
| ☑ Blood Donation | Restricted | [ Edit Timetable ] |

[ Add Break ]

Schedule

*layout described in the text of the spec...*

[ Done ]

FIG. 11A

Schedule

| | |
|---|---|
| 10:00 AM - 12:00PM | All non-restricted services |
| 11:15AM - 12:00PM | Apheresis Donation |
| 12:00PM - 1:00PM | Break |
| 1:00PM - 2:05PM | All non-restricted services |
| 1:00PM - 2:05PM | Apheresis Donation |
| 2:05PM - 2:10PM | Break |
| 2:10PM - 4:00 PM | All non-restricted services |
| 2:10PM - 4:00PM | Apheresis Donation |

| Start time | Apheresis (30 min) | Blood Donation (15 min) | Consultation (max 30 min) | Max Possible Appts. |
|---|---|---|---|---|
| 10:00AM | 4 | 4 | 4 | 12 |
| 10:15AM | 4 | 4 | 4 | 0 |
| 10:30AM | 4 | 4 | 4 | 12 |
| 10:45AM | 4 | 4 | 4 | 0 |
| 11:00AM | 4 | 4 | 4 | 6 |
| 11:15AM | 4 | 4 | 4 | 0 |
| 11:30AM | | | | break |
| 11:45AM | | | | break |
| 12:00PM | | | | break |
| 12:15PM | | | | break |
| 12:30PM | 4 | 4 | 4 | 3 |
| 12:45PM | 4 | 4 | 4 | 0 |
| 1:00PM | 4 | 4 | 4 | 12 |
| Max Possible Appts. | 42 | 57 | 22 | 124 |

FIG. 13

RESOURCE-BASED CAPACITY SCHEDULING SYSTEM

BACKGROUND OF THE INVENTION

The present invention relates to a scheduling system. More specifically, the present invention relates to a resource-based scheduling system that schedules appointments for resources based on capacity.

Current automated scheduling systems are adapted to automatically schedule appointments for resources that can serve a single user. Even where the resource can serve a plurality of different customers or consumers, it is scheduled as if it can serve only one. For instance, some scheduling systems allow a user to schedule the use of a conference room. Even though the conference room can contain multiple individuals, the conference room is scheduled the same regardless of how many individuals will be using the conference room. Therefore, if a single user wishes to schedule a conference room, the conference room is booked during the time period requested by the single user. However, if multiple users wish to schedule the conference room for a meeting, the conference room is again booked for the time requested for the meeting. There is no difference between booking the resource (i.e., the conference room) for a single user and booking it for multiple users.

Current scheduling systems that schedule resources that can handle separate appointments by multiple customers or users simultaneously are primarily scheduling systems which rely on hand entries. A scenario which illustrates some of the complexities associated with such a system is a blood center. For example, in such centers, there are often several different types of resources which can be scheduled for multiple customers at any given time. One resource includes the beds available for blood donors. A blood center may, for example, have ten beds such that ten different customers can be giving blood at any given time.

However, such businesses offer additional complexities. The same blood center may have then beds, but only three nurses or technicians on staff to begin the blood donation process. Therefore, even though ten customers can be giving blood at any given time, only three new donors can be admitted and set up for blood donation at a given time. The same blood center may also have different resources, such as doctors, which are available for consultations. Assuming the blood center has three doctors, three different consultations can be going on at any one time. Further, three different consultations can be started at the same time, so long as the doctors are available at that time.

To add further complexity to such a system, the available resources may change from day to day, or even throughout a single day. For example, doctors, nurses and technicians at the blood center may be unavailable during lunch, or during breaks at different times of the day. In addition, the staffing of the blood center may vary throughout the week so there are more personnel on staff during certain days of the week, and less during other days of the week.

From this example, it can be seen that, in general, any given business has a product mix (which can be tangible products or services) that the business is trying to sell or schedule. The way in which the resources (or products) are scheduled is based on availability and capacity. However, the efficiency and productivity of the business may depend on how well appointments for resources can be scheduled, such that the capacity of the resources is maximally used. To date, this has been done using manually maintained scheduling books and calendar systems.

SUMMARY OF THE INVENTION

The present invention describes the scheduling requirements of a business to an automatic scheduling system in a way which allows efficient automatic scheduling of appointments for resources of the business. In one embodiment, the scheduling system schedules the resources based not only on total capacity, but based on how many appointments can be initiated at a given time.

In a further embodiment of the invention, the schedule is implemented by maintaining two data structures in a database. One data structure corresponds to total capacity while the other data structure corresponds to start time capacity. In one embodiment, one of the data structures is updated so that, when searching for available appointment times, only one of the data structures needs to be consulted.

BRIEF DESCRIPTION OF THE DRAWINGS

FIGS. 5A-5H illustrate maintaining a total capacity structure and a start time capacity structure in accordance with one embodiment of the present invention.

FIGS. 6A and 6B illustrate one representation of a Services or AppointmentType object.

FIG. 7 illustrates one representation of a Resource object.

FIG. 8 illustrates one representation of a Schedule object.

FIGS. 9 and 10 illustrates one representation of a maximum capacity structure.

FIGS. 11A and 11B illustrate another embodiment of a Schedule object.

FIGS. 12A and 12B illustrate modification of a maximum capacity structure.

FIG. 13 illustrates a representation of a start time capacity and maximum capacity data structure.

DETAILED DESCRIPTION OF ILLUSTRATIVE EMBODIMENTS

The present invention deals with an automated resource scheduling system. However, prior to discussing the present invention in detail, one illustrative environment in which the present invention can be used will be discussed.

Figure 1:
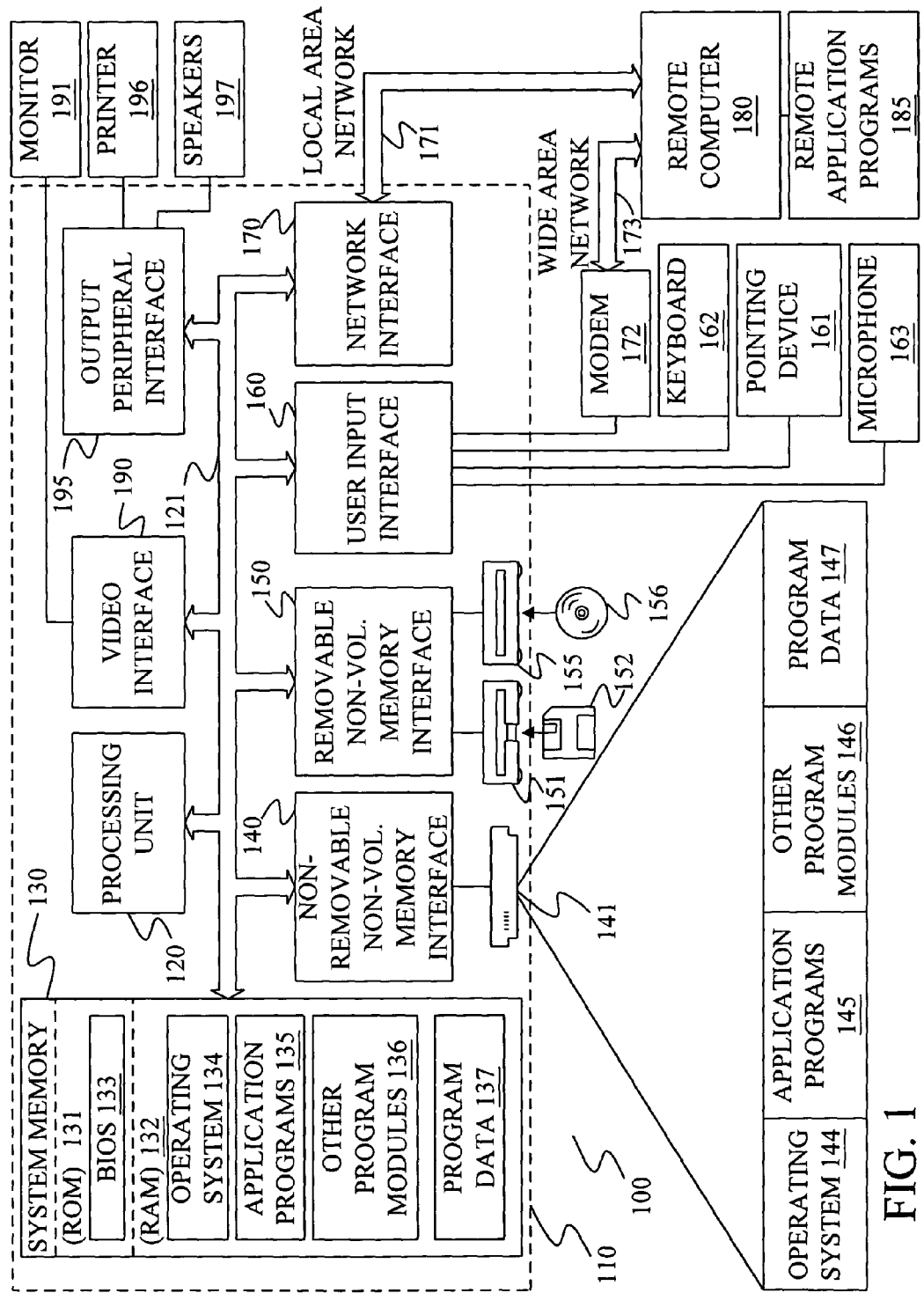
FIG. 1 is a block diagram of one illustrative environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
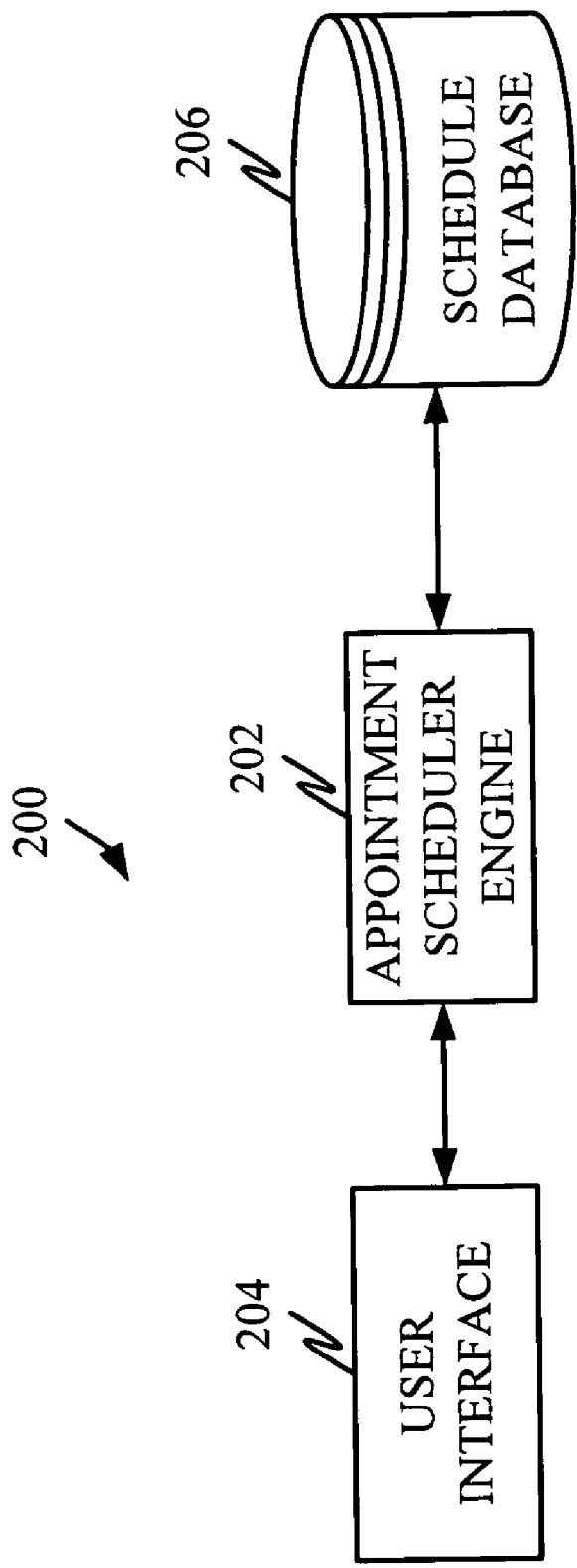
FIG. 2 is a block diagram of one embodiment of a scheduling system in accordance with the present invention.

FIG. 2 is a block diagram of a resource scheduling system 200. Scheduling system 200 includes an appointment scheduler engine 202 which is accessed by a user though user interface 204. Engine 202 creates and modifies appointments, work schedules and resource representations and stores them in schedule database 206. In one illustrative embodiment, the appointments are represented by objects, as are the work schedules and resources. The data represented by those objects is stored in schedule database 206. In one illustrative embodiment, database 206 is a relational database, such as one accessed using the structured query language (SQL). Of course, database 206 can be an object oriented database or an object relational database or any other suitable database. In one embodiment, the data representing the appointments, work schedules and resources can simply be data stored in tables or otherwise, instead of objects.

However to use system 200, a user can search schedule database 206 for available times for which an appointment is desired. The user provides a search request through user interface 204 to appointment scheduler engine 202. Scheduler engine 202 executes the search against the schedule database 206 and returns available appointment slots to user interface 204.

A user can also simply schedule an appointment in a similar fashion. The user provides an appointment request through user interface 204 to appointment scheduler engine 202. Appointment scheduler engine 202 creates an object representative of the appointment to be scheduled and relates it to the resource being consumed by the appointment as well as the work schedules affected by the appointment. These items are all stored by appointment scheduler engine 202 in schedule database 206.

Prior to discussing the present invention in more detail, two concepts regarding scheduling in accordance with the present invention are discussed. Those concepts include a total capacity limit and a start time capacity limit.

The total capacity limit refers to the total number of customers that can be served by a given service over a given time period. For example, again referring to the blood center example discussed in the background portion of the specification, the total capacity refers to the total number of blood donors that can be simultaneously serviced at any given time. Of course, the total capacity may vary based on the size of the staff currently on duty, etc.

Figure 2A:
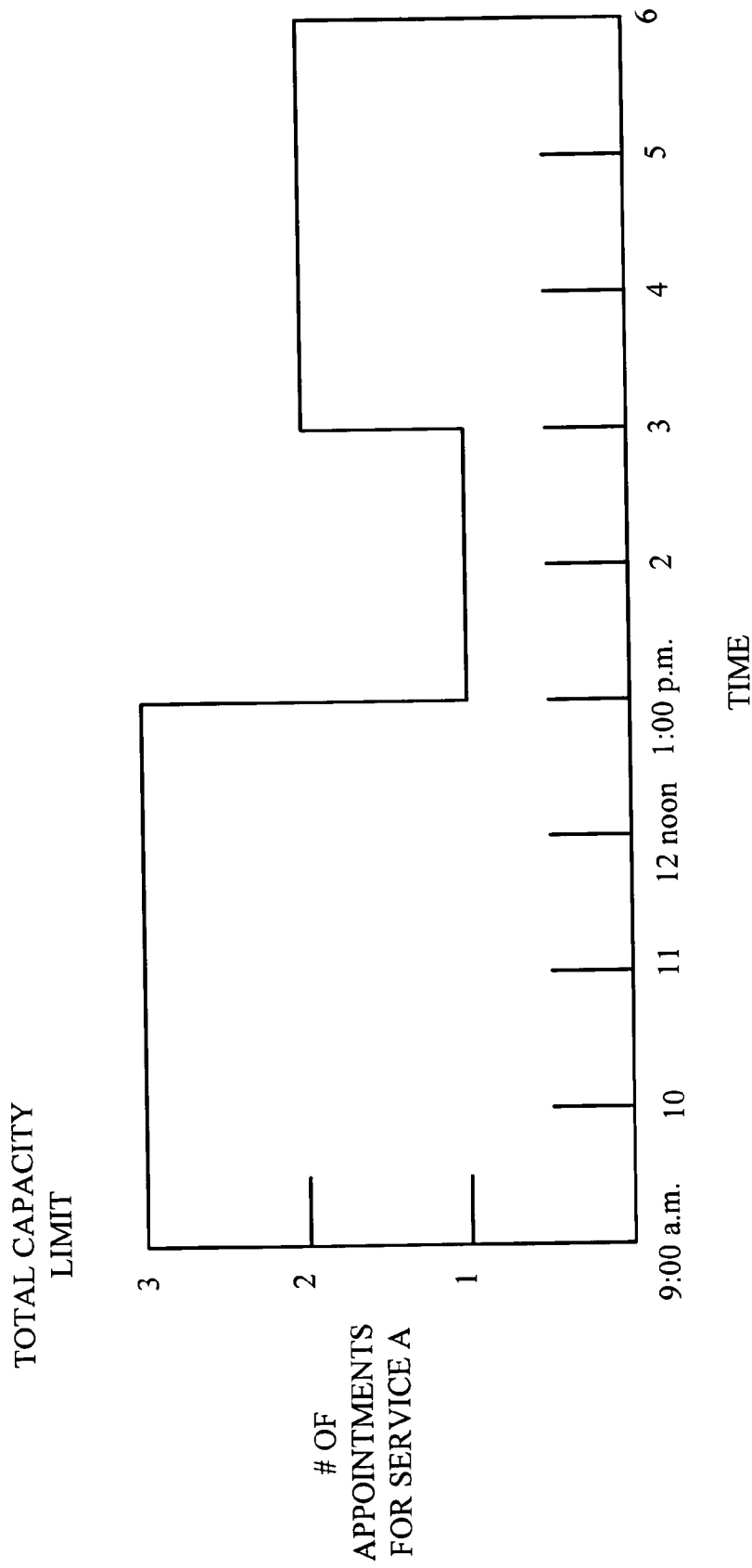
FIGS. 2A-2E graphically illustrate a total capacity limit.

FIG. 2A graphically illustrates the total capacity concept. FIG. 2A shows a graph with a number of appointments available for a service (designated as service A) along one axis and time along the other axis. FIG. 2A illustrates that the total number of appointments that can occur currently between the hours of 9:00 a.m. and 1:00 p.m. is three. This may, for example, indicate that the blood center only has three beds available for blood donors from 9:00 a.m. to 1:00 p.m. Between the hours of 1:00 p.m. and 3:00 p.m., the total number of appointments which can be scheduled concurrently for service A is one. Thus, perhaps the number of beds available drops to one during this time period because the others undergo periodic cleaning. Then, between the hours of 3:00 p.m. and 6:00 p.m., the total number of concurrent appointments which can occur for service A is two. For example, one of the three beds may be required for other procedures during that time.

Figure 2B:
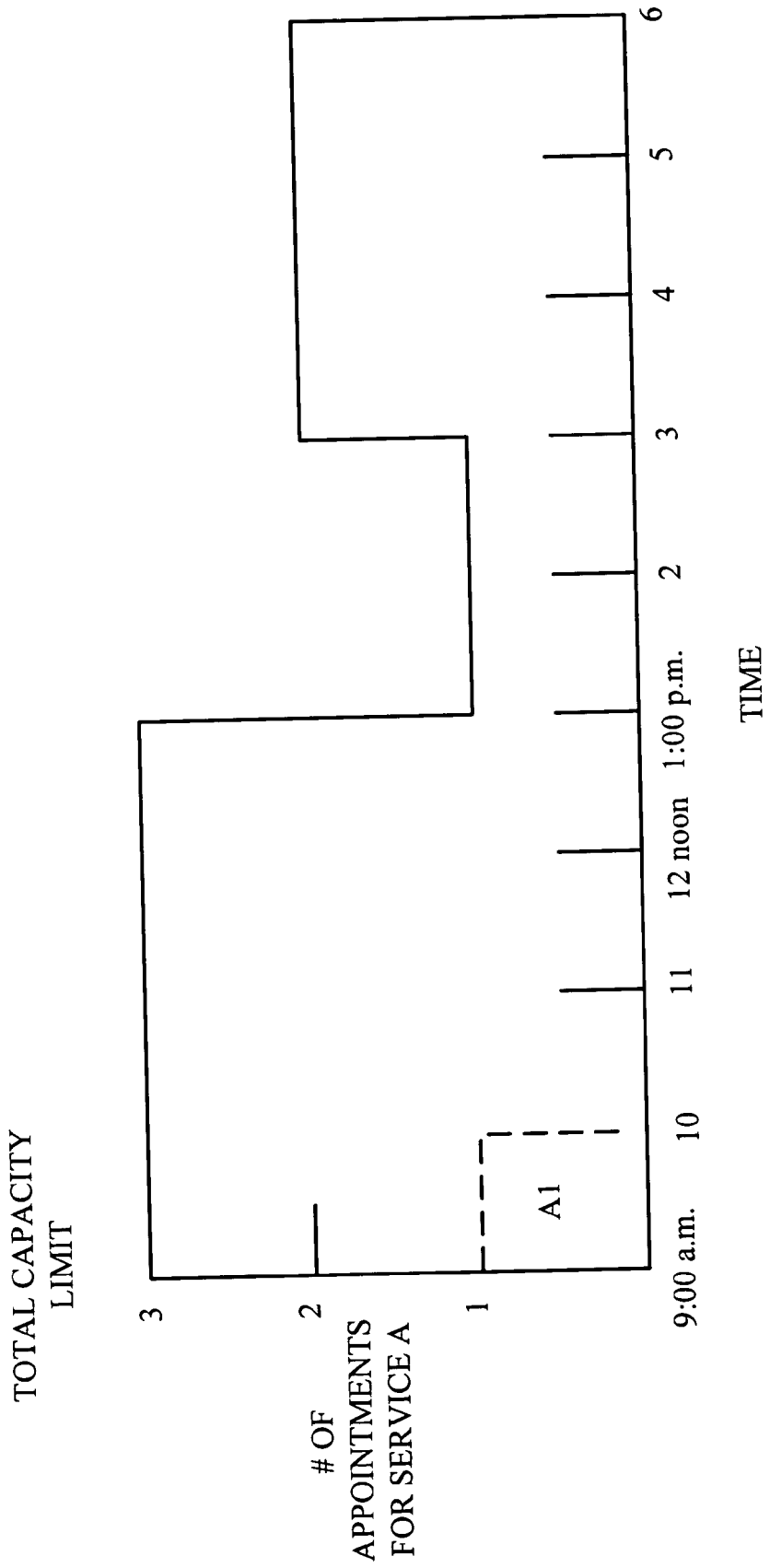
Figure 3A:
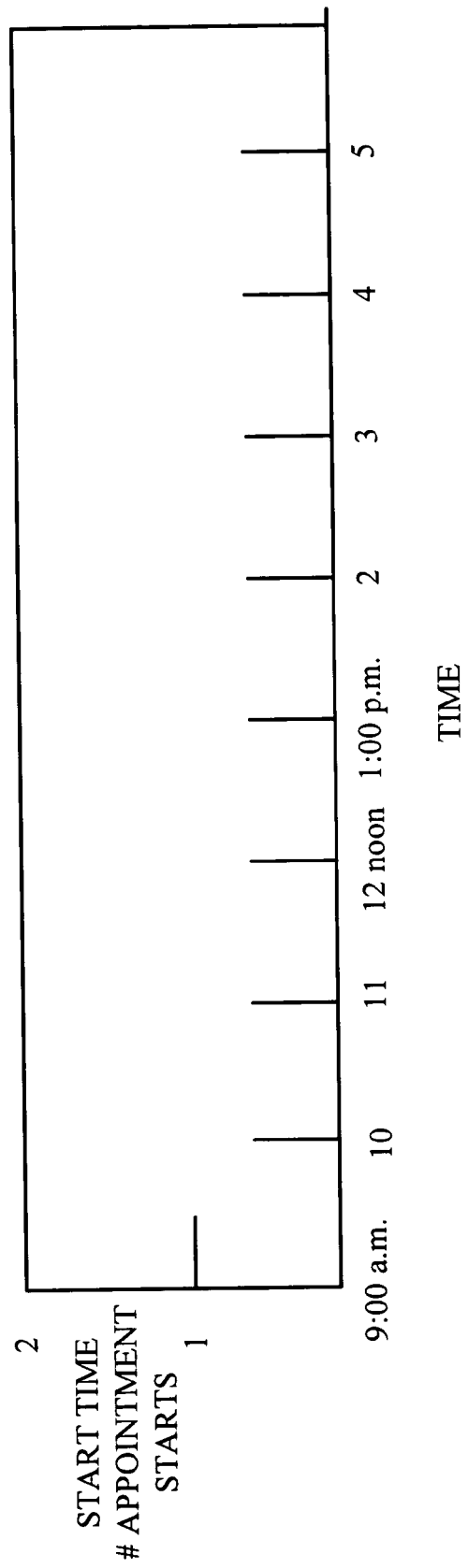
FIGS. 3A-3E graphically illustrate a start time appointment limit.

The second scheduling concept discussed with respect to the present invention is start time capacity. This is graphically illustrated in FIG. 3A and refers to the number of appointments for a given service which can be started at a specific time. Again, using the blood center as an example, assume that a technician does not need to be available during an entire blood donation procedure, but only needs to be available at the beginning of a blood donation appointment, in order to set the donor up on the blood donation apparatus. In that case, the total number of blood donation appointments which can occur concurrently may be equal to the total number of beds in the facility, but the total number of appointments which can begin at any given start time corresponds to the number of technicians on duty at that start time. FIG. 3A graphically illustrates that, between the hours of 9:00 a.m. and 6:00 p.m., the total number of appointments that can be started at any given start time is two. The way in which the constraints associated with the graphs shown in FIGS. 2A and 3A can be represented to appointment schedule engine 202, through rules, as described in greater detail below with respect to FIGS. 6A-13. Before proceeding with that description, an embodiment of how appointment scheduler engine 202 operates given those rules is first discussed with respect to FIGS. 2B-3E.

Figure 4:
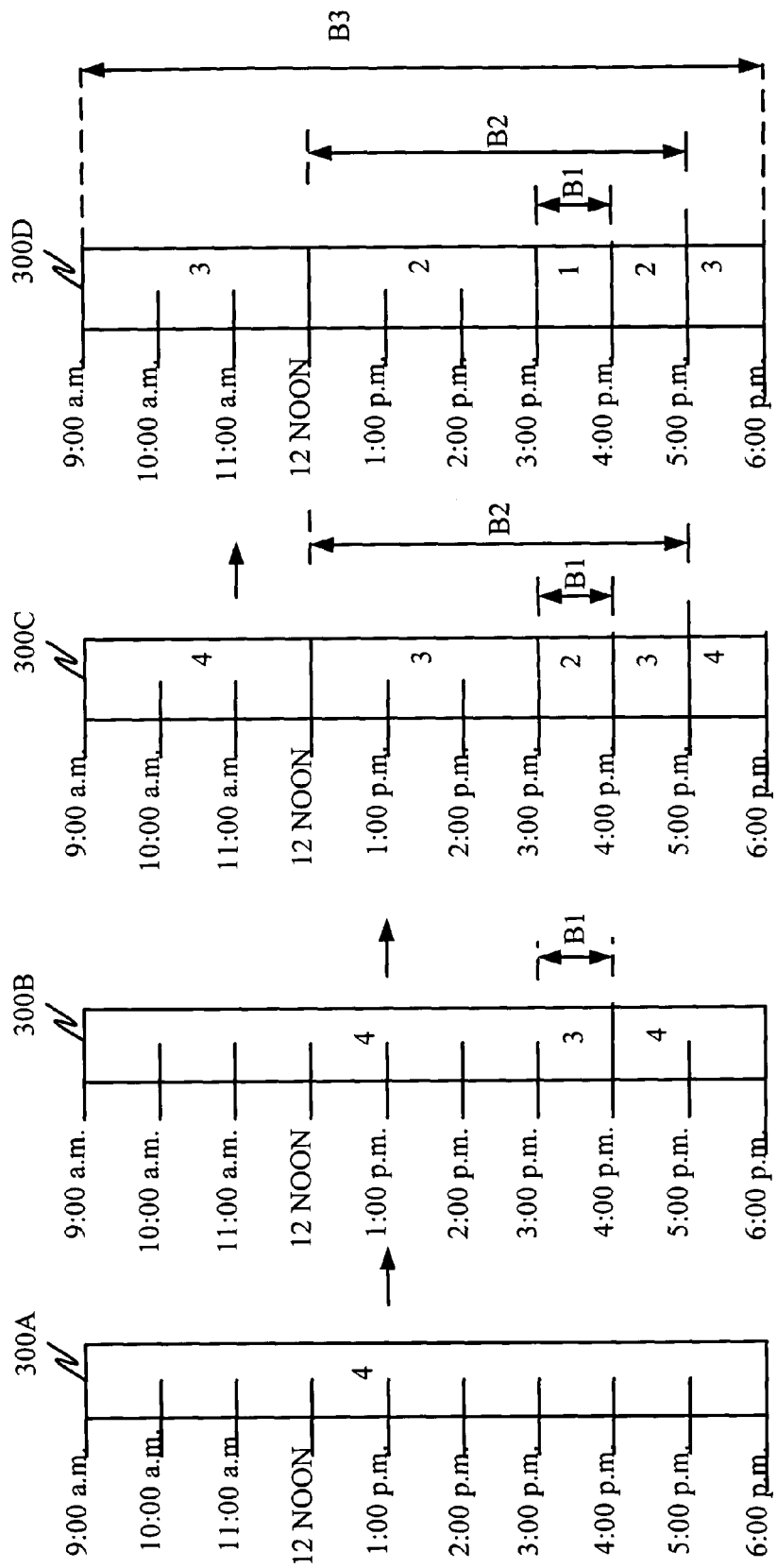
FIG. 4 illustrates the maintenance of a total capacity structure in accordance with one embodiment of the present invention.
Figure 5A:
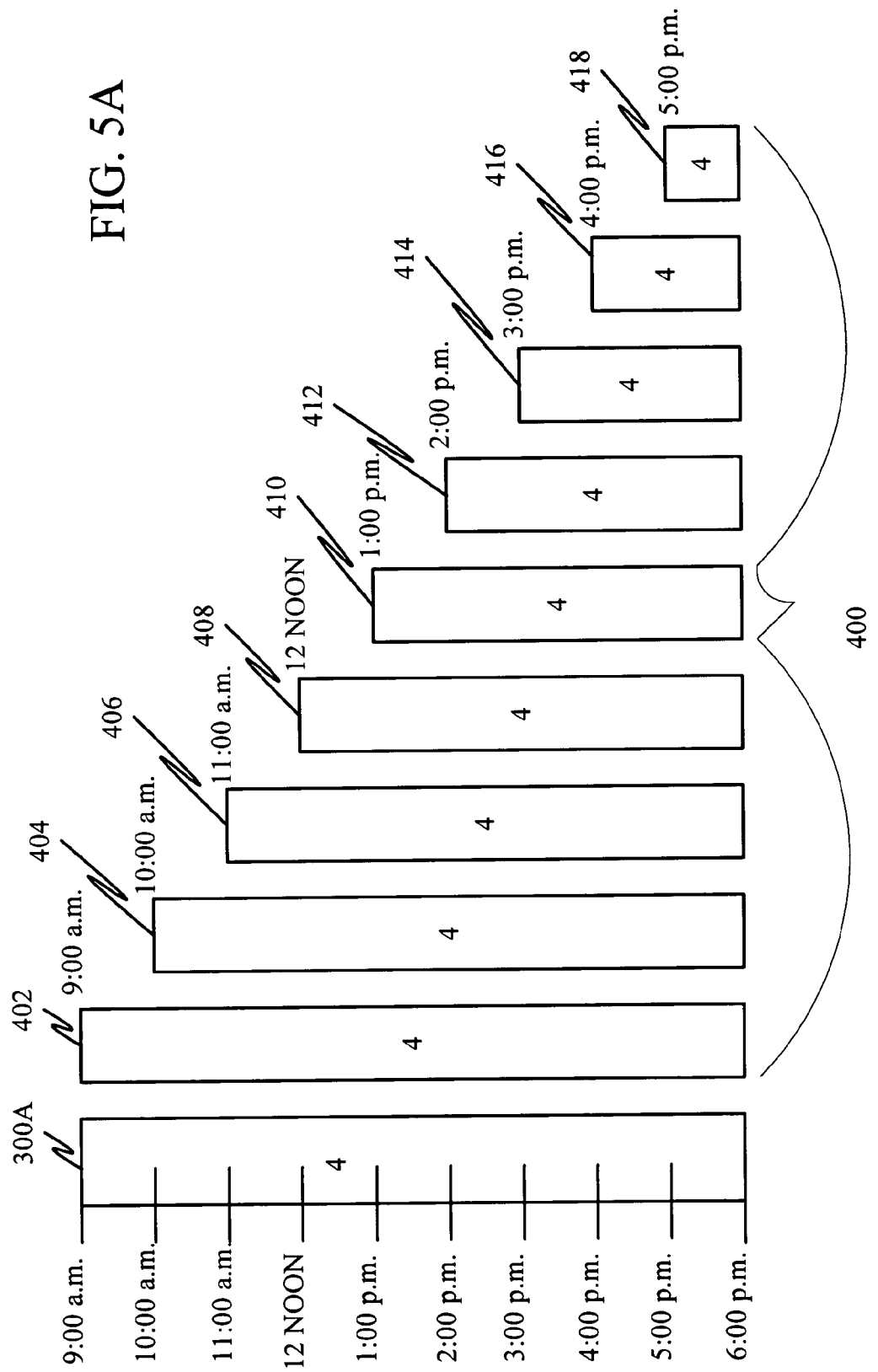
Figure 5B:
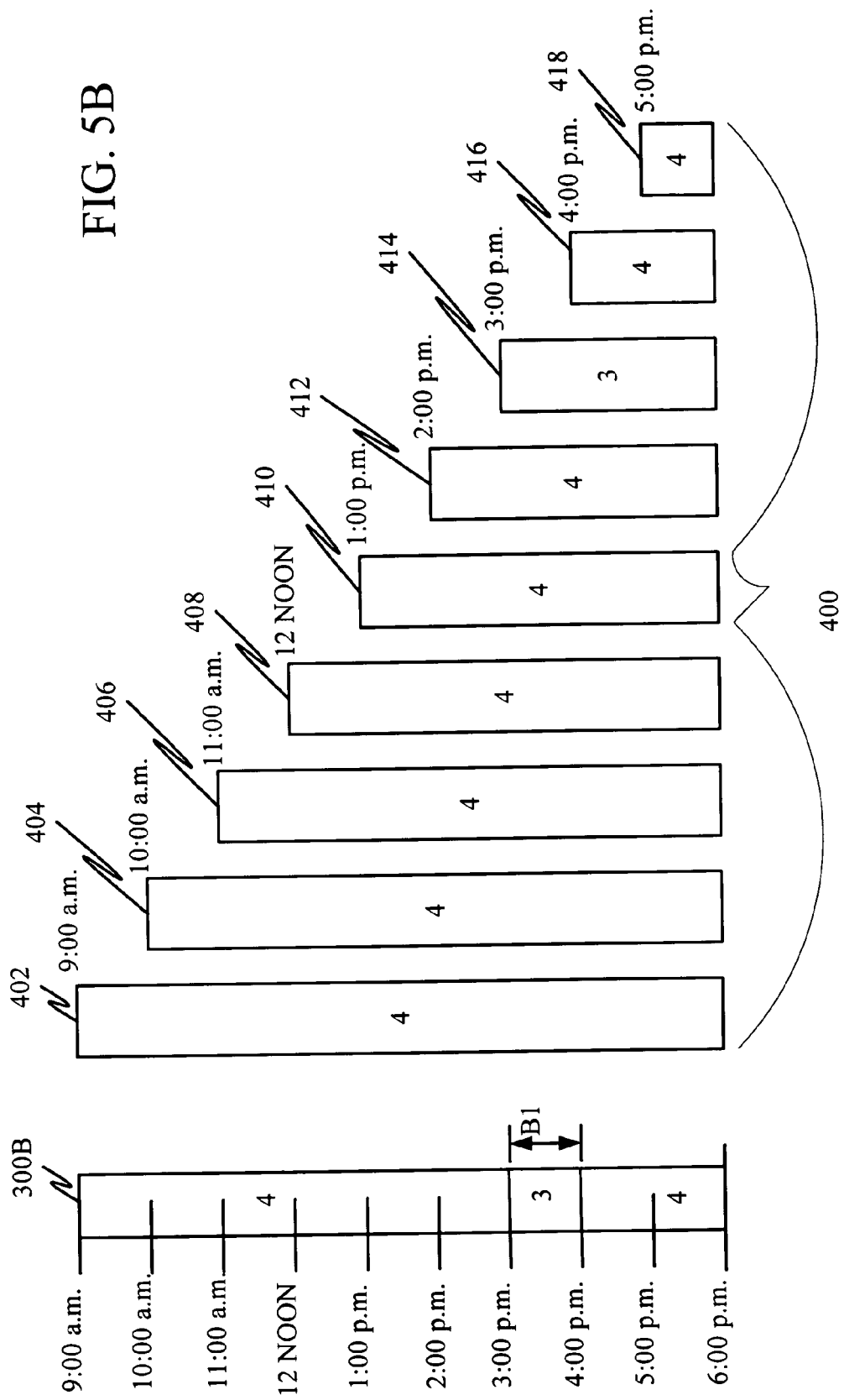
Figure 5D:
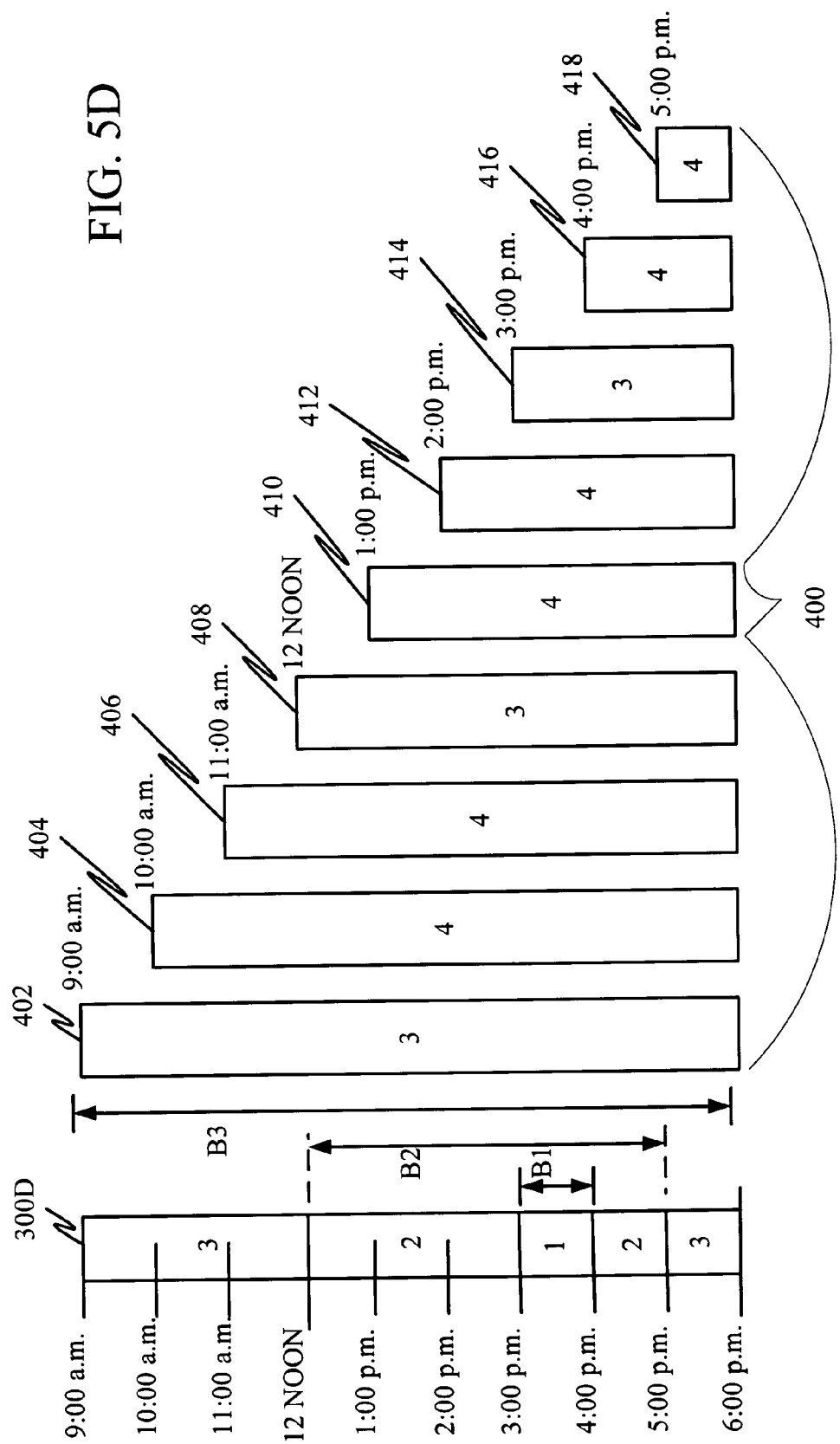
Figure 5F:
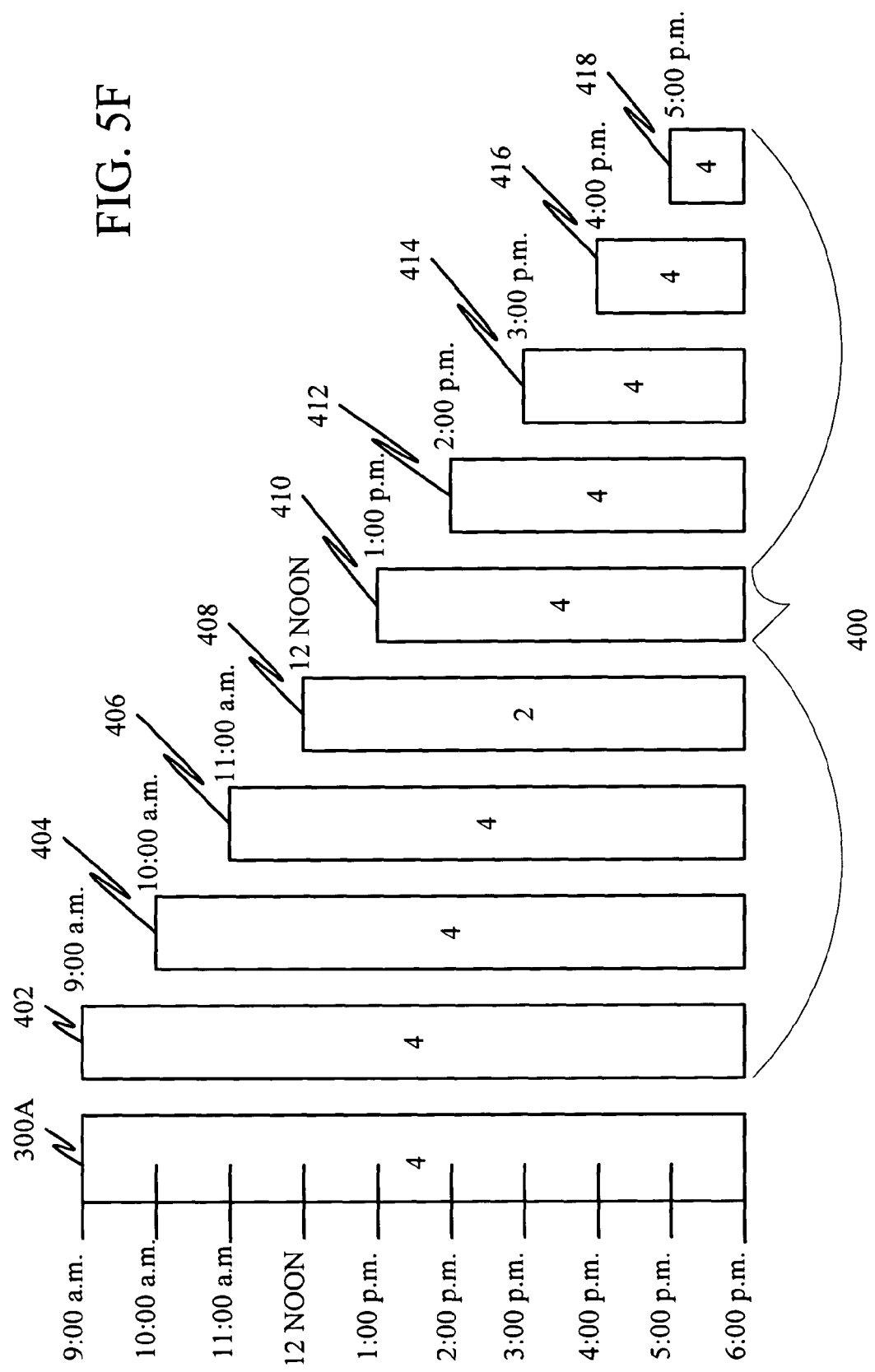
Figure 5G:
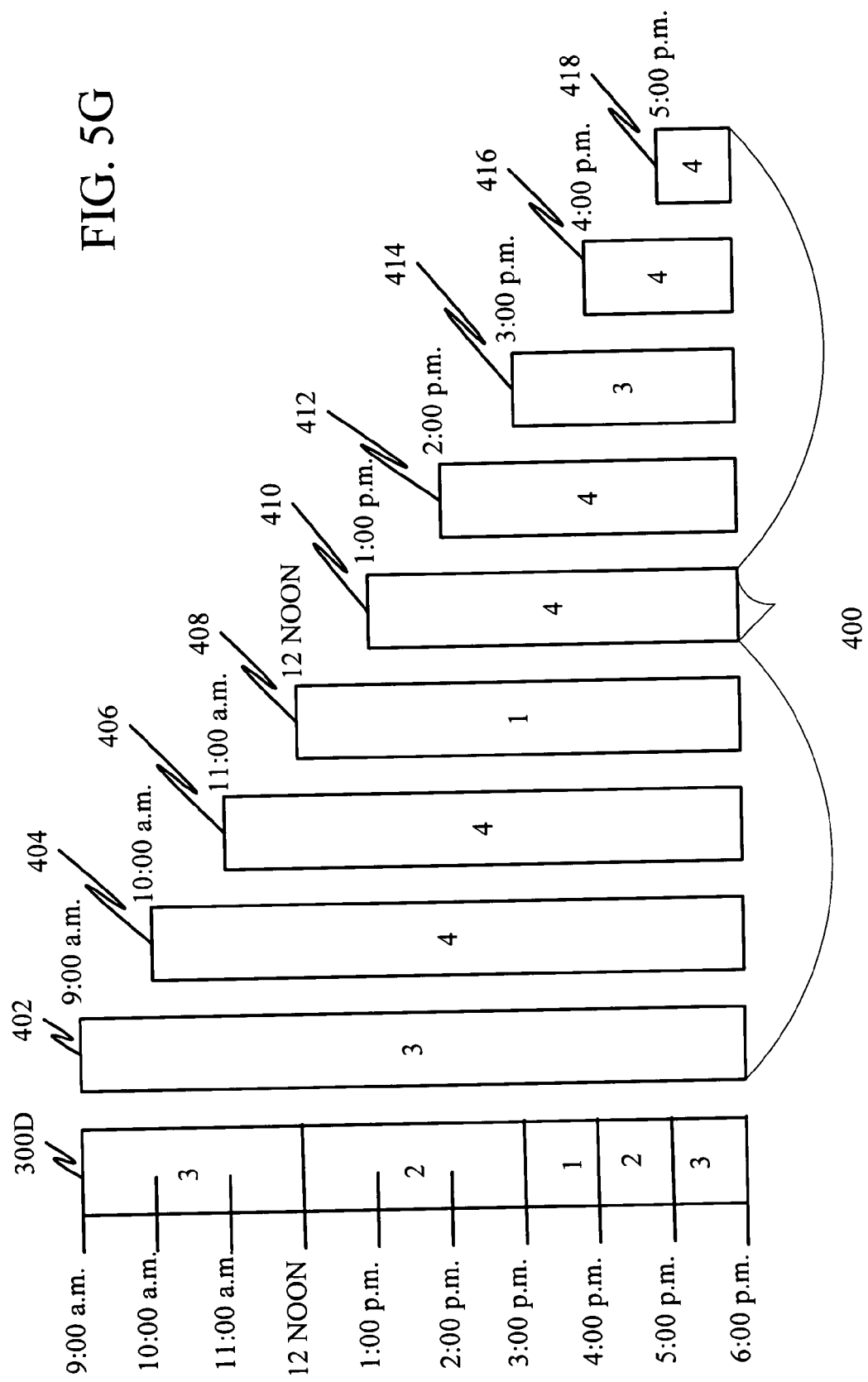
Figure 5H:
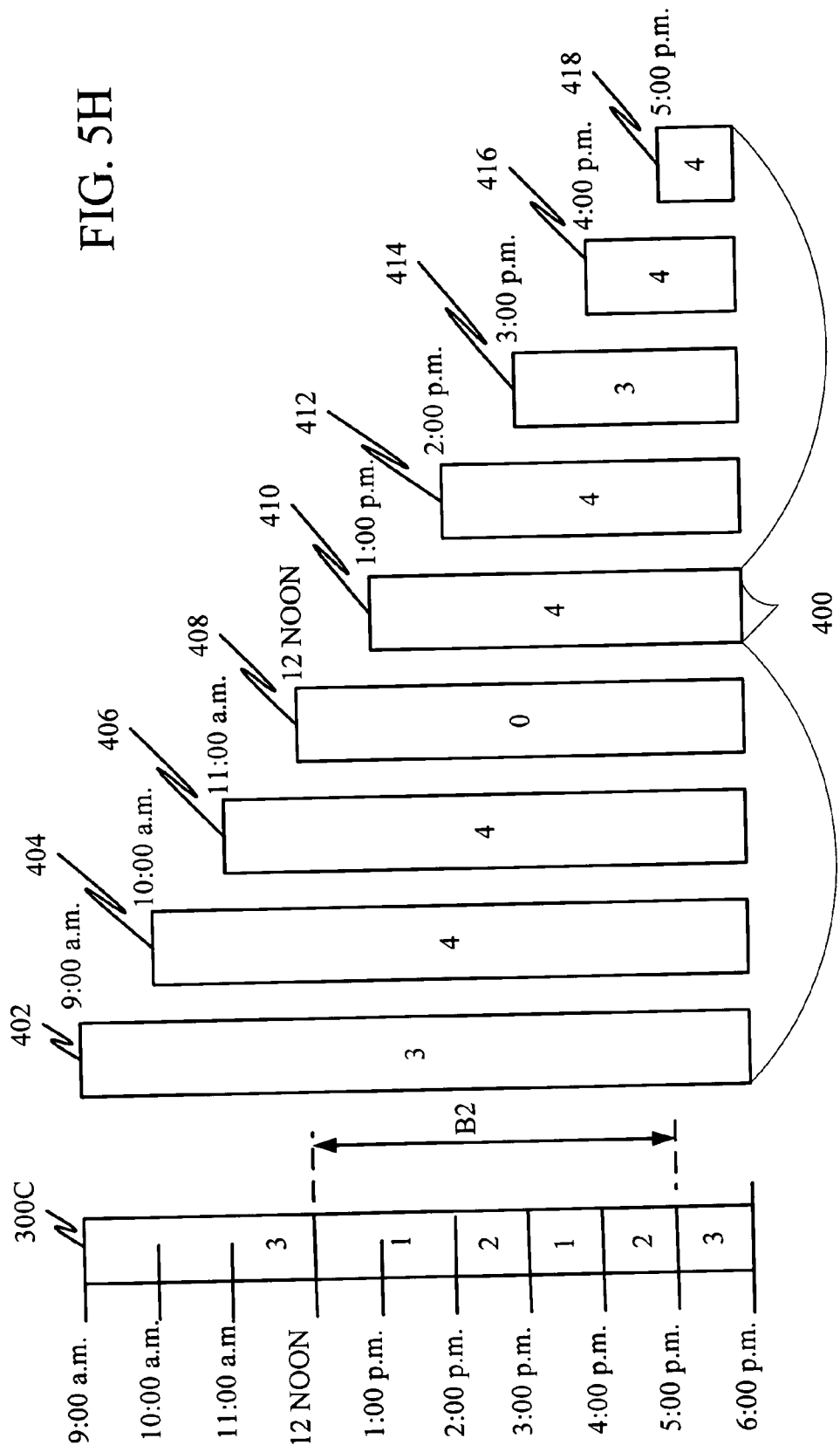

In one illustrative embodiment, and as is described in greater detail with respect to FIGS. 4-5H, engine 202 maintains two data structures for each service in schedule database 206. A first data structure corresponds to the total capacity limit for that service and the second data structure corresponds to the total start time capacity for that service.

Assume for the sake of the present description that service A corresponds to a blood donation and that the total capacity of blood donation appointments is represented by the graph shown in FIG. 2A and the total start time capacity for blood donations is shown by the graph in FIG. 3A. Further assume that appointments can be scheduled starting on the hour, every hour from 9:00 a.m. to 6:00 p.m.

Figure 3B:
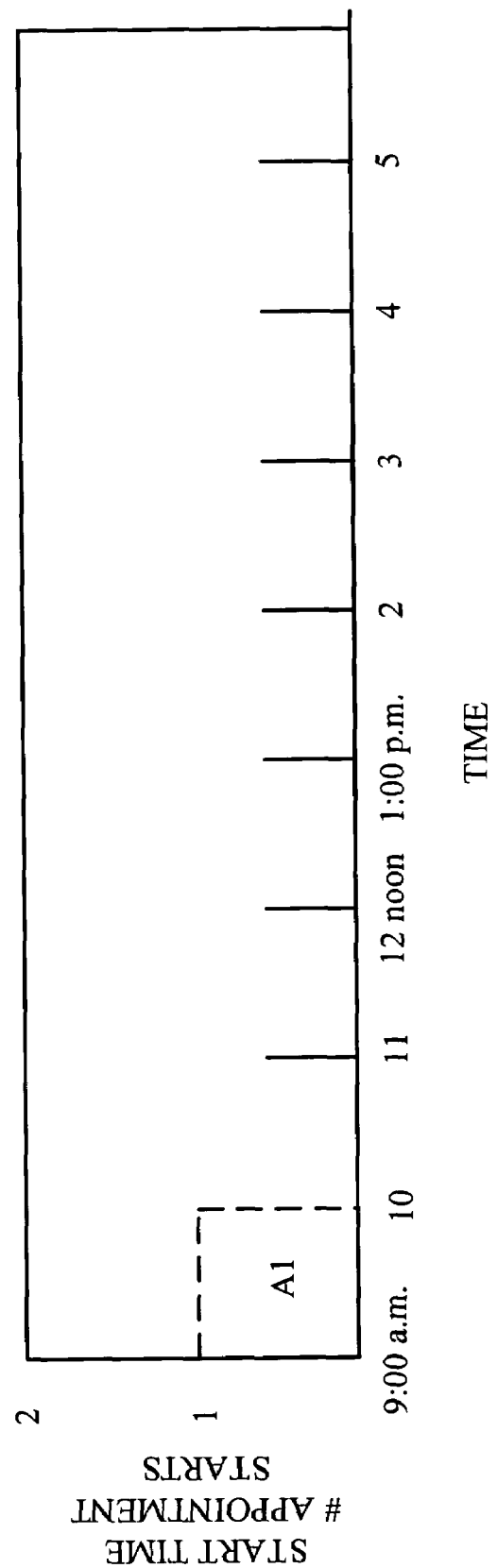

A user then schedules an appointment for a blood donation (designated by A1) by providing an input to user interface 204. The appointment has a duration of one hour. Appointment scheduler engine 202 then modifies schedule database 206 to show that an appointment A1 has been scheduled from 9:00 a.m. to 10:00 a.m. This is illustrated in FIGS. 2B and 3B. FIG. 2B shows that engine 202 has updated the total capacity limit data structure in database 206 for blood donations to show that appointment A1 has been scheduled. Engine 202 also illustratively updates the total start time capacity data structure in database 206 to show that one of the available start times at 9:00 has been scheduled.

Figure 2C:
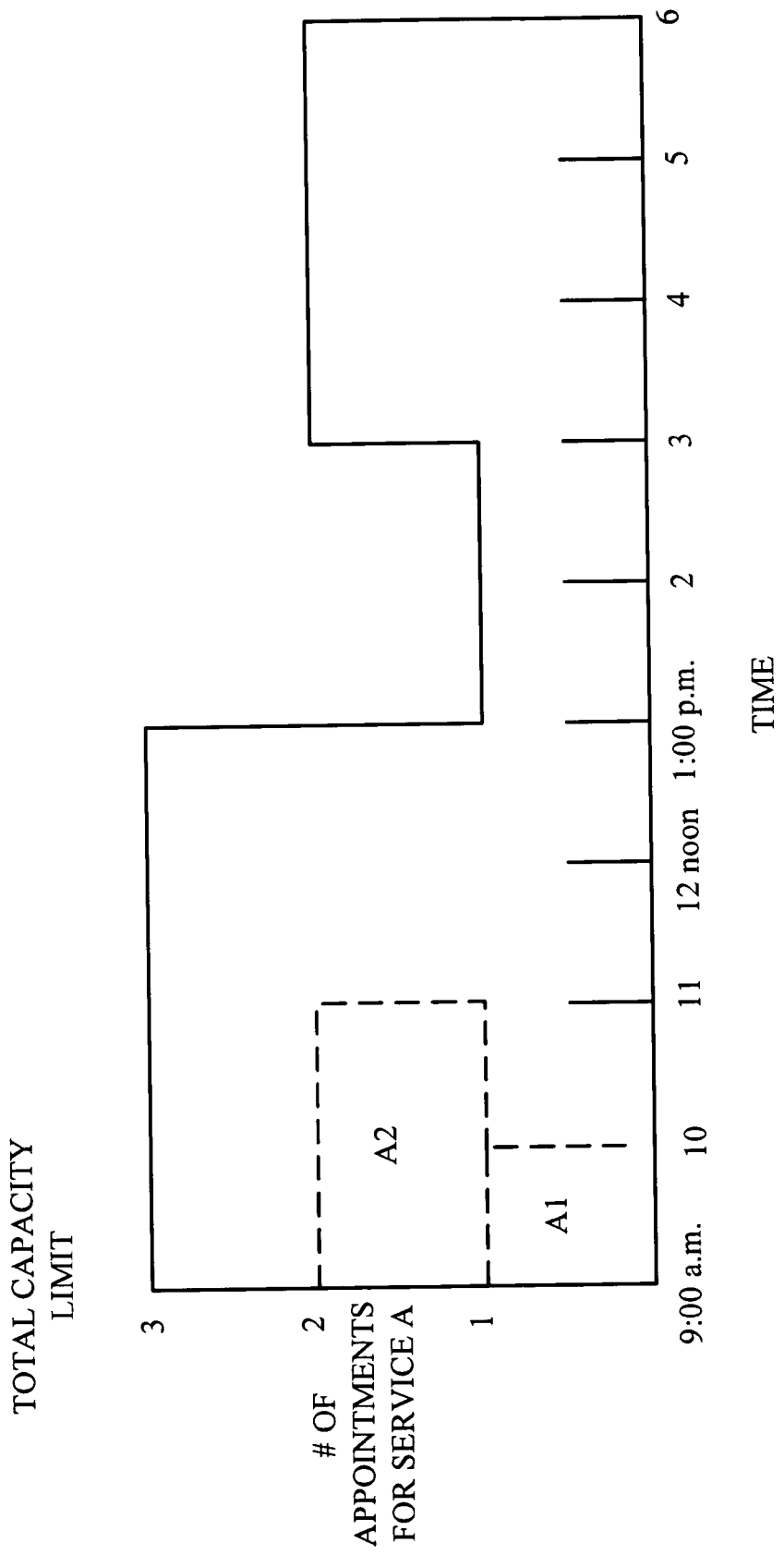
Figure 3C:
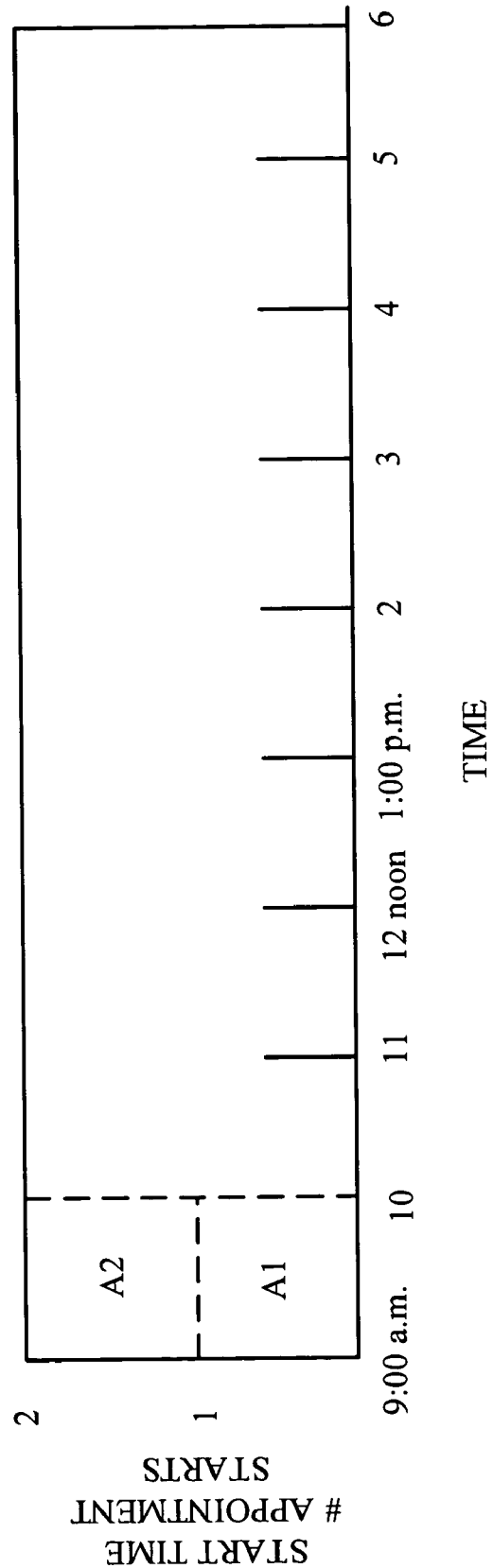
Figure 3D:
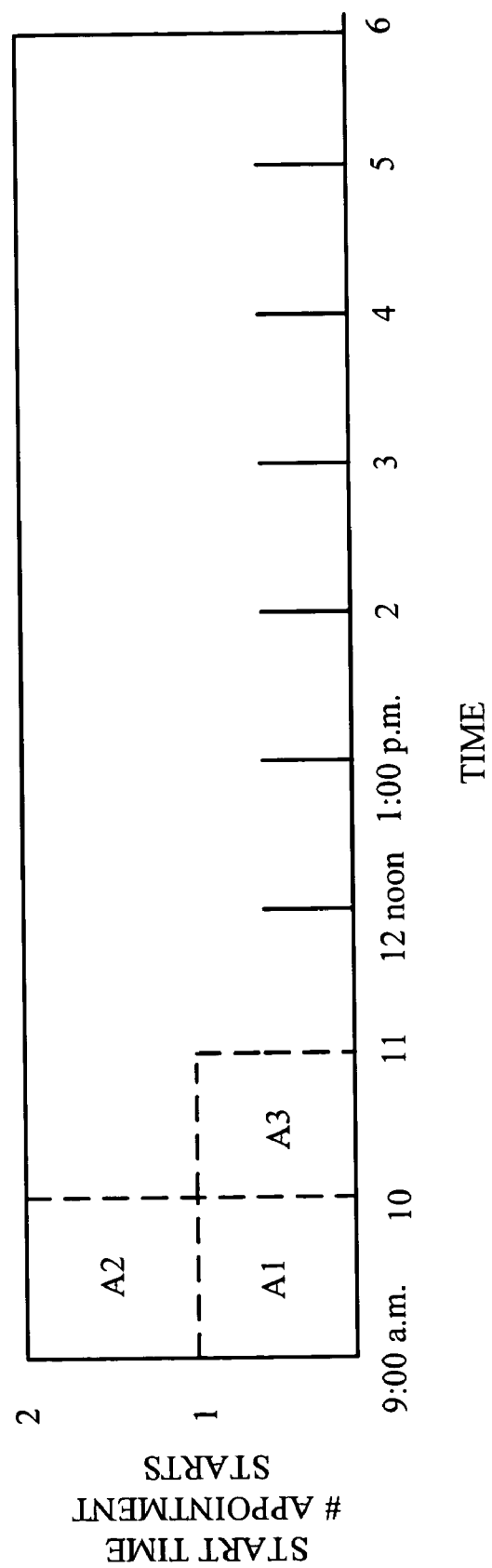
Figure 3E:
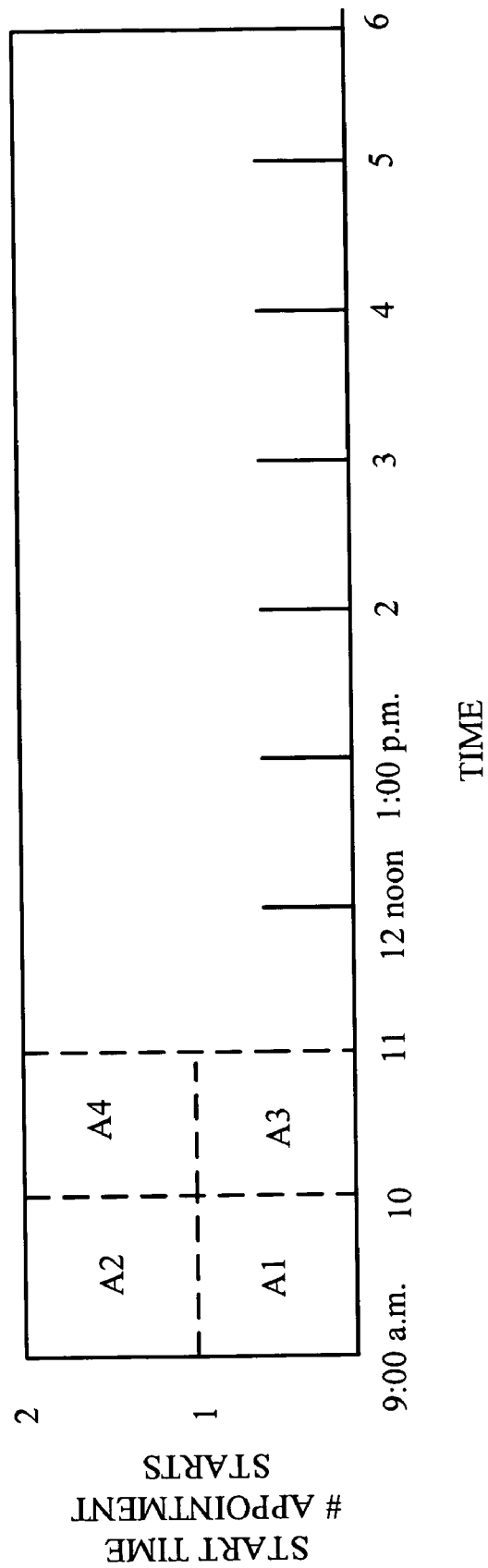

Another user then schedules a blood donation appointment designated by A2 with a duration of two hours beginning at 9:00 a.m. Again, engine 202 updates the total capacity limit data structure, as shown in FIG. 2C, to show the second blood donation appointment A2. Further, engine 202 updates the total start time capacity data structure also indicating that the second blood donation appointment has been scheduled at 9:00 a.m. At this point, even though there is capacity to have another blood donation appointment occurring at 9:00 a.m., the start time capacity has been reached and therefore engine 202 will not schedule another blood donation appointment beginning at 9:00 a.m. This is shown in FIG. 3C.

Figure 2D:
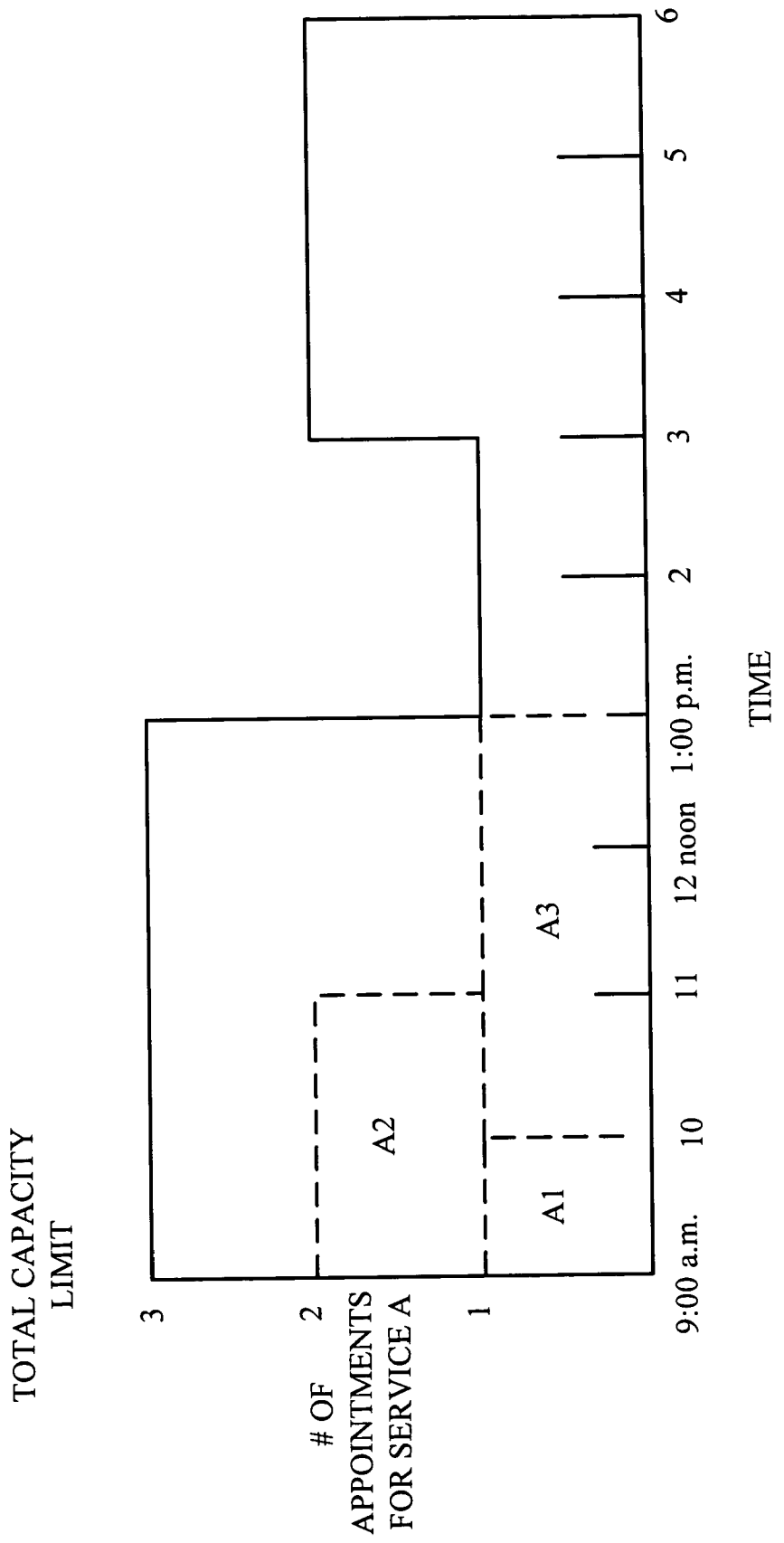

Now, a user schedules a three-hour blood donation appointment designated by A3 beginning at 10:00 a.m. Again, engine 202 updates the total capacity limit data structure, as shown in FIG. 2D with the third blood donation appointment A3. Engine 202 also updates the total start time capacity data structure shown in FIG. 3D. That data structure shows that an appointment has been scheduled to start at 10:00 a.m.

Figure 2E:
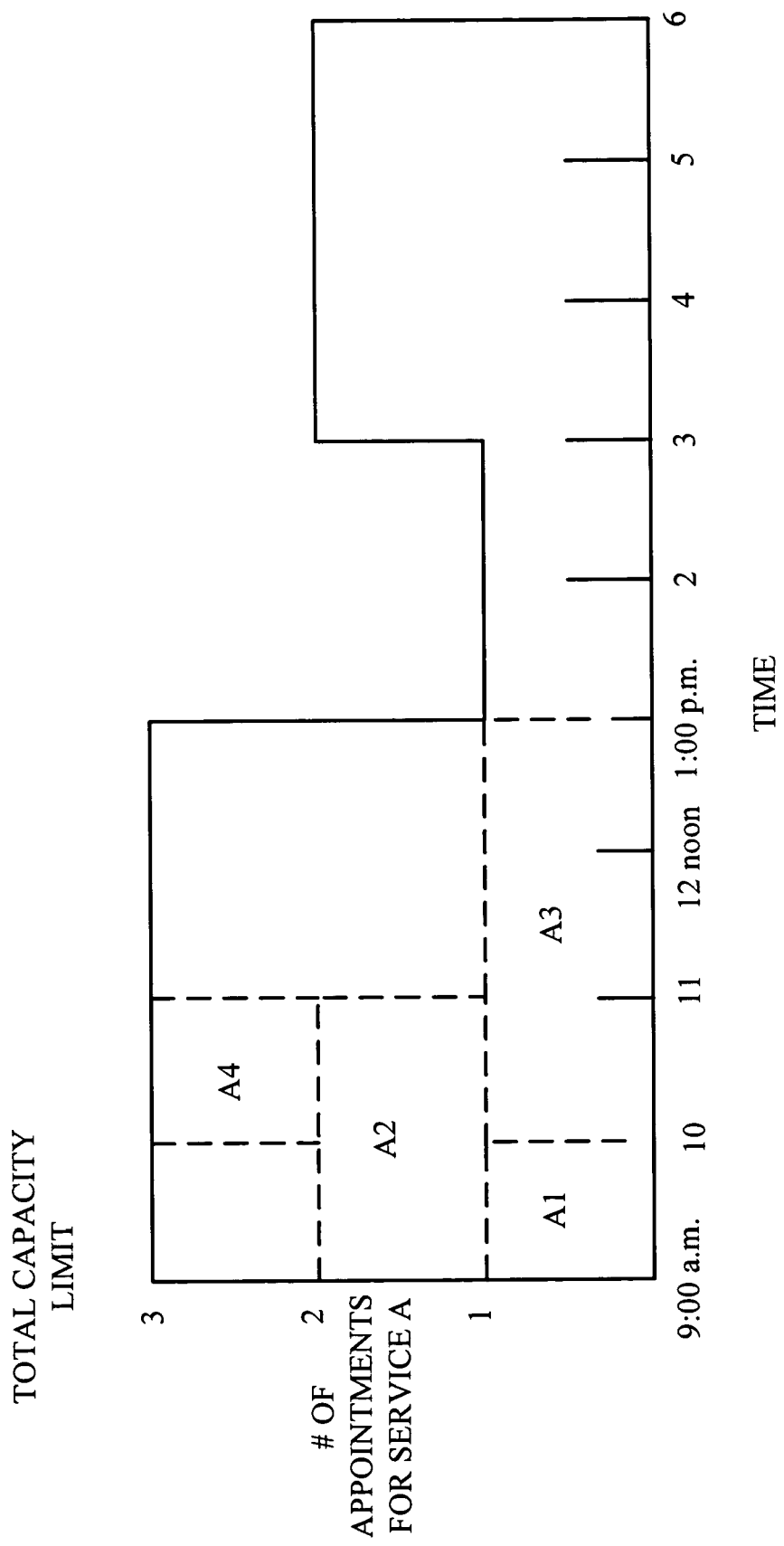

Finally, a user schedules a one-hour blood donation appointment beginning at 10:00 a.m. Engine 202 updates the total capacity limit data structure shown in FIG. 2E to indicate that the fourth blood donation appointment designated by A4 has been scheduled from 10:00 a.m. to 11:00 a.m. Thus, the total capacity for blood donation appointments between 10:00 a.m. and 11:00 a.m. has been reached and no further appointments will be scheduled to overlap that time, regardless of when they start. Engine 202 also illustratively updates the total start time capacity data structure shown in FIG. 3E. That data structure also shows that the start time capacity has been reached for appointments starting at 10:00 a.m. and therefore no appointments will be scheduled to start at 10:00 a.m. either.

It can be seen by the graphical illustrations set out in FIGS. 2A-3E that, in accordance with one embodiment, searching for an available appointment time can be done simply by searching the data structures represented in those Figures. The user simply needs to provide the type of appointment, and the duration of the appointment, and the data structures can be searched to find available time slots for which the total capacity limits and total start time limits have not been reached.

FIG. 4 illustrates one specific embodiment for implementing total capacity data structure 300 in schedule database 206. FIG. 4 shows data structure 300 in a different state 300A-300D after appointments are scheduled. Data structure 300 illustratively, corresponds to a row in database 206. Data structure 300 corresponds to the total capacity available for appointments of a given appointment type from 9:00 a.m. to 6:00 p.m. The number in the center of data structure 300A illustrates that the total capacity for concurrent appointments to be occurring from 9:00 a.m. to 6:00 p.m. is four. Therefore, during any hour between 9:00 a.m. and 6:00 p.m., the total capacity for this service allows four appointments to be occurring concurrently. Data structure 300A also shows that none of the appointments have been consumed (or that no appointments have been scheduled) between 9:00 a.m. and 6:00 p.m.

FIG. 4 also shows data structure 300 as 300B after an appointment for the service (represented by B1) has been scheduled between 3:00 p.m. and 4:00 p.m. Therefore, the row in the database represented by data structure 300B is split and the block indicator representing the time between 3:00 p.m. and 4:00 p.m. has a total capacity 3 associated with it and the blocks prior to 3:00 p.m. and after 4:00 p.m. both still have the number 4 associated therewith. This indicates that the total capacity for the service is diminished by one between 3:00 p.m. and 4:00 p.m. Therefore, the total remaining number of appointments which can be scheduled to overlap the time slot 3:00 p.m.-4:00 p.m. is 3.

FIG. 4 next shows that the data structure 300 has again been modified as shown at 300C. A second appointment for the service represented by the data structure has been scheduled between 12 noon and 5:00 p.m. This appointment is represented by B2. Therefore, the data structure is again split into more blocks. The block between 3:00 p.m. and 4:00 p.m. now has its total capacity indicator decreased by one, to two. The blocks from 12 noon and 3:00 p.m. and from 4:00 p.m. to 5:00 p.m. have their total capacity reduced by one over the data structure shown at 300B. Therefore, each of those blocks has a total capacity indicator which is now set to three. This shows that one appointment is taking place between 12 noon and 3:00 p.m. and from 4:00 p.m. and 5:00 p.m. and that two appoints are taking place concurrently between 3:00 p.m. and 4:00 p.m. The remainder of the day has no appointments scheduled, and thus the total capacity indicator for the hours 9:00 a.m.-12 noon and 5:00 p.m.-6:00 p.m. remain at four.

Next, data structure 300 is modified as shown at 300D. FIG. 4 shows that a third appointment for the service represented by the data structure shown therein has been scheduled between 9:00 a.m. and 6:00 p.m. This appointment is illustrated by B3. Thus, since this appointment lasts the entire day, all of the blocks have their total capacity indicators decreased by one. Hence, one appointment is taking place between the hours of 9:00 a.m. and 12 noon and between the hours of 5:00 p.m. and 6:00 p.m. This is appointment B2 and thus the total capacity remaining between those hours is three. Two appointments are taking place at the same time between the hours of 12 noon and 3:00 p.m. and between 4:00 p.m. and 5:00 p.m. These are appointments B2 and B3 which overlap during those hours. Thus, the total capacity indicator associated with those time blocks has been decreased to two. Finally, three appointments are taking place during the time period 3:00 p.m. to 4:00 p.m. All three appointments, B1, B2 and B3 are occurring during that time period and thus the total capacity indicator associated with that time period has been reduced by three, to one.

It should be noted, for the sake of simplicity, the total capacity was shown as constant in data structure 300A. The total capacity was four for the entire day 9:00 a.m. to 6:00 p.m. Of course, if the total capacity were actually varied during the day, data structure 300A would begin with multiple blocks, each having a total capacity indicator associated with it wherein the total capacity indicator varied according to the total capacity available throughout the day.

FIGS. 5A-5H illustrate another specific way in which total capacity data structure 300 as well as a total start time capacity data structure 400 can be implemented by engine 202 in database 206. FIG. 5A shows that total capacity data structure 300 is represented by the numeral 300A and is similar to that shown as 300A in FIG. 4.

However, FIG. 5A also shows that another data structure 400 represents a portion of database 206 that stores the total appointment start time capacity for the service represented by structures 300 and 400. Structure 400 includes a number of substructures 402-418. Each of the substructures corresponds to an allowed start time for the service represented in FIG. 5A. The allowed start times for appointments are every hour on the hour. Thus, substructure 402 corresponds to a start time capacity for appointments starting at 9:00 a.m. Substructure 404 corresponds to a start time capacity for appointments starting at 10:00 a.m. Substructure 406 corresponds to a start time capacity for appointments starting at 11:00 a.m., etc. In one embodiment, each of the substructures in start time capacity substructure 400 is represented by a separate line in database 206.

Also, it should be noted that structure 400 in FIG. 5A illustrates a service for which appointments can be scheduled starting every hour. Of course, if the allowed start times for the appointments occur every half-hour or every 15 minutes, for example, then there would be double or quadruple, respectively, the number of substructures associated with the service in order to represent start time capacity. Also, each substructure in structure 400 includes a start time capacity indicator. The indicators in each of the substructures 402-418 are set to four when no appointments have been scheduled. This indicates that four appointments can be scheduled to start at each start time. As will be described, the start time capacity indicators are decreased each time an appointment is scheduled to start at the allowed start time represented by the particular substructure 402-418.

FIG. 5B shows data structures 300 and 400 after appointment B1 has been scheduled. Thus, data structure 300 is updated to 300B and data structure 400 shows that substructure 418 which corresponds to a start time of 3:00 p.m. has been updated such that its start time capacity has been dimensioned by one, to three.

FIG. 5C shows the structures after appointment B2 has been scheduled. The total capacity structure is modified to that designated by 300C and start time capacity structure 400 is modified so that substructure 408 has a start time capacity indicator that has been decreased to three. This is because appointment B2 starts at 12 noon which corresponds to start time substructure 408.

FIG. 5D shows that total capacity structure 300 has been modified to structure 300D because appointment B3 has been scheduled. FIG. 5D also shows that substructure 402 of start time capacity structure 400 has been modified such that its start time capacity indicator has been reduced by one, to three. This is because appointment B3 is scheduled to start at 9:00 a.m., which is the start time corresponding to substructure 402.

FIG. 5E shows structures 300 and 400 with yet another appointment, B4 scheduled starting at 3:00 p.m. and lasting until 6:00 p.m. Thus, there are four overlapping appointments in the time period 3:00 p.m.-4:00 p.m. The total capacity for that time span is thus reduced to zero.

In accordance with one embodiment of the present invention, all of the substructures 402-414 which begin either at 3:00 p.m. or before 3:00 p.m. are truncated at 3:00 p.m. This is indicated by the cross-hatching. They are truncated because they represent appointments that must be started either at 3:00 p.m. or before. However, because there is no remaining total capacity from 3:00 p.m. to 4:00 p.m., any appointments started before 3:00 p.m. cannot extend past 3:00 p.m.

As shown in FIG. 5E substructures 416 and 418 are not affected because they represent start times at 4:00 p.m. or later, where there is both start time capacity available and total capacity available. Therefore, appointments can still be scheduled to start at those times.

Modifying structure 400 in this way is an optional step and renders some advantages. The advantages yielded by this optional step relate to searching for available appointment slots. It can be seen that substructure 402 indicates that appointments can be started at 9:00 a.m. and can have a duration of six hours (they can extend to 3:00 p.m.) without violating the total capacity or start time capacity limits. Similarly, structure 404 indicates that appointments can be scheduled beginning at 10:00 a.m. and can have a duration of five hours (extending to 3:00 p.m.). Substructure 406-412 indicate the same except that the start times are advanced by one hour, and the durations are shortened by an hour for each subsequent substructure. The structure 414 has its start time capacity indicator reduced to zero.

Therefore, when a user requests an appointment time, the only structure which needs to be initially searched is structure 400, which also reflects structure 300. Of course, the answer to whether an appointment can be scheduled will vary based on its duration. For instance, three appointments can be started at 9:00 a.m. which have duration to noon. Only two can be started at 9:00 a.m. if they extend past noon and none can be started at 9:00 a.m. if they extend past 3:00 p.m. For example, if a user requests an appointment beginning at 1:00 p.m. and extending for three hours, engine 202 can search substructure 400 and determine whether the appointment is available. By searching substructure 410, it can be seen that an additional start time is available at that time. Also, since substructure 410 has not been eliminated or truncated beginning at 1:00 p.m., that indicates that there is still total capacity available. However, because the duration of substructure 410 is not at least three hours, that indicates that the total capacity has run out and thus the requested appointment cannot be accommodated.

However, if the user were to request the same appointment beginning at noon, structure 400 can be searched and it will be determined by examining substructure 408 that both the start time capacity and the total capacity limits remain sufficient to accommodate the requested appointment. That is because substructure 408 extends for the duration of the requested appointment, and its start time indicator indicates that there is at least one start time available beginning at noon. Of course, after the requested appointment is scheduled, structure 300 is again modified to indicate the diminished total capacity and substructure 408 is modified to indicate the diminished start time capacity.

FIGS. 5F-5H illustrate yet another embodiment of the present invention. FIG. 5F is similar to FIG. 5A except that substructure 408 indicates that the total number of start times available at 12 noon are two. This may occur, for example, if the number of technicians in the blood center which are available over lunch is diminished to two.

FIG. 5G shows substructures 300 and 400 after all of appointments B1-B3 have been scheduled. The total capacity structure is represented by structure 300D as it is in FIG. 5D. However, structure 400 is different because the start time capacity of substructure 408 began at two and has thus been diminished to one. This is because appointment B2 begins at noon, which corresponds to the start time for substructure 408. Therefore, there is only capacity to start one additional appointment at noon.

FIG. 5H shows substructures 300 and 400 when an additional appointment has been scheduled (B5) between noon and 2:00 p.m. Structure 300 is represented by 300F which shows that the total capacity for the block between noon and 2:00 p.m. has now been diminished to one. In addition, FIG. 5H shows that the start time capacity indicator in substructure 408 has been diminished to zero. This is because appointment B5 begins at noon. Therefore, when searching for available appointments or for a requested appointment, structure 400 will indicate that no appointments can be started at noon, because the indicator in substructure 408 has been reduced to zero. This is the case even though there is total capacity available at noon. This corresponds to a scenario, for example, where the blood center has a total of three beds, but only two technicians on duty and over the lunch hour and two appointments have been scheduled to start at noon. Therefore, the one remaining bed will remain empty.

The specific scheduling concepts that are represented by objects in accordance with one embodiment of the present invention are now discussed. A first type of object represents appointment types or services which can be made using the present system. The AppointmentTypes (or Services) object represents named tasks or services to be scheduled (such as blood donation, consultation, evaluation, etc.). The AppointmentTypes or Services object includes attributes that specify the name of the object, the duration that the customer and provider are required to devote to the AppointmentType or Service, pricing information related to the AppointmentType or Service and a description of the AppointmentType or Service. Of course, these attributes are exemplary only and some of them (such as pricing, description, name etc.) have nothing to do with scheduling.

Figure 6A:
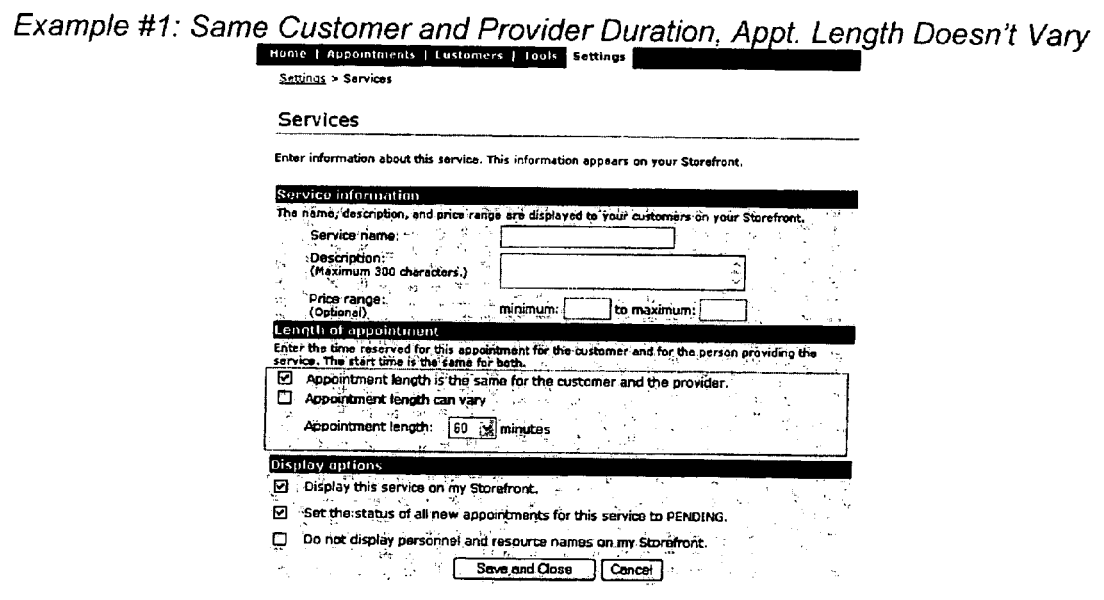

FIGS. 6A and 6B illustrate embodiments of graphically user interface representations generated by user interface 204 to represent an AppointmentType or Services object. FIG. 6A shows that the object includes service information, such as the name and description and price range for the service, as well as a field describing the length of the appointment. The appointment may be different lengths for the customer and the provider. For instance, a blood donation appointment may only require 15 minutes of a technician's time, but may require 30-60 minutes of a customer's time. Finally, a field is provided for display options which indicate how the service is to be represented to customers through user interface 204.

FIG. 6B is a more detailed illustration of the length of appointment field. FIG. 6B shows that appointment lengths can be chosen for the customer and provider and can be variable in length for each.

Another type of object that represents a scheduling concept is referred to as a Resource object. The Resource object identifies a Resource which is consumed by an appointment. A Resource object may represent, for example, a physical asset such as a room or a bed or a person that performs services. The Resource object includes attributes which, for example, identify the name of the resource, the appointment types or services that are supported or performable by the resource, security attributes which describe a given person's access rights to the resource, and a work schedule that is used by the resource.

FIG. 7 illustrates one graphical representation that can be generated by user interface 204 to represent a Resource object. As seen, the Resource object represented by the representation of FIG. 7 includes a display name and description, as well as an indication of what type of services or appointments are supported by the resource. By identifying the appointment types or services supported or performable by the resource, this field maps between the specific resource represented by the object, and the services that can be performed by the resource.

Each of the resources has a corresponding work schedule or availability plan that it uses. The work schedule or availability plan describes the working hours corresponding to the resource, such as when staff is available, the time of breaks, lunch hours, etc. Each work schedule is also illustratively represented by an object. The WorkSchedule object includes attributes that represent working hours, breaks, for each service performed or service group, the time ranges and associated volume/capacity corresponding to those time ranges. Thus, the work schedule describes, for each service, the amount of volume that a business wishes to offer at given times. For example, a blood center may wish to offer blood donation appointments at all times during the day, but consultation, blood marrow donations and apheresis donations only at specific limited times of the day.

One embodiment of a graphical display generated by user interface 204 to represent a WorkSchedule object is shown in FIG. 8. FIG. 8 not only illustrates a schedule corresponding to each day of the week for the given service, but also indicates how often appointments are started and exceptions to the schedule.

FIG. 9 illustrates a graphical representation of the total capacity data structure 300 shown in the previous Figures. The representation shown in FIG. 9 corresponds to the total capacity of a resource given the fact that two different appointment types can be scheduled. Blood donation appointments can be scheduled as well as apheresis appointments. The illustration shown in FIG. 9 indicates that from 10:00 a.m. to 4:00 p.m., five appointments can be scheduled concurrently, including three blood donation appointments and two apheresis appointments, wherein the appointments can start every 15 minutes.

FIG. 10 illustrates the "schedule" section of FIG. 9 in greater detail. FIG. 10 shows that the rules for total capacity include up to four concurrent appointments for the first service and up to two concurrent appointments for the second service from 8:00 a.m. to 12:00 p.m. and 8:00 a.m. to 11:00 a.m., respectively. From noon to 5:00 p.m., up to three appointments for the first service can be accommodated. FIG. 10 also shows a number of start time restrictions. The restrictions indicate, at 8:00 a.m., at most one appointment from service group two can be started and at 9:00 a.m. and 11:00 a.m. at most three appointments from the first service can be started.

FIGS. 11A and 11B illustrate another embodiment for representing capacity. The representation is similar to that shown in FIG. 9, except that under the "Services Performed" field a scheduled time section is added which indicates that the times can be restricted or Nonrestricted. "Non-restricted" designates services that do not have time restrictions set on them, while "Restricted" designates services that do have time restrictions set on them. FIG. 11B shows one embodiment of the "schedule" section of the representation shown in FIG. 11A. The "schedule" section in FIG. 11B illustrates when Non-restricted services are offered and when restricted services are offered. It should be noted that while single services are shown in FIGS. 11A and 11B, additional services can be added or services can be grouped together, as well.

Figures 12A, 12B:
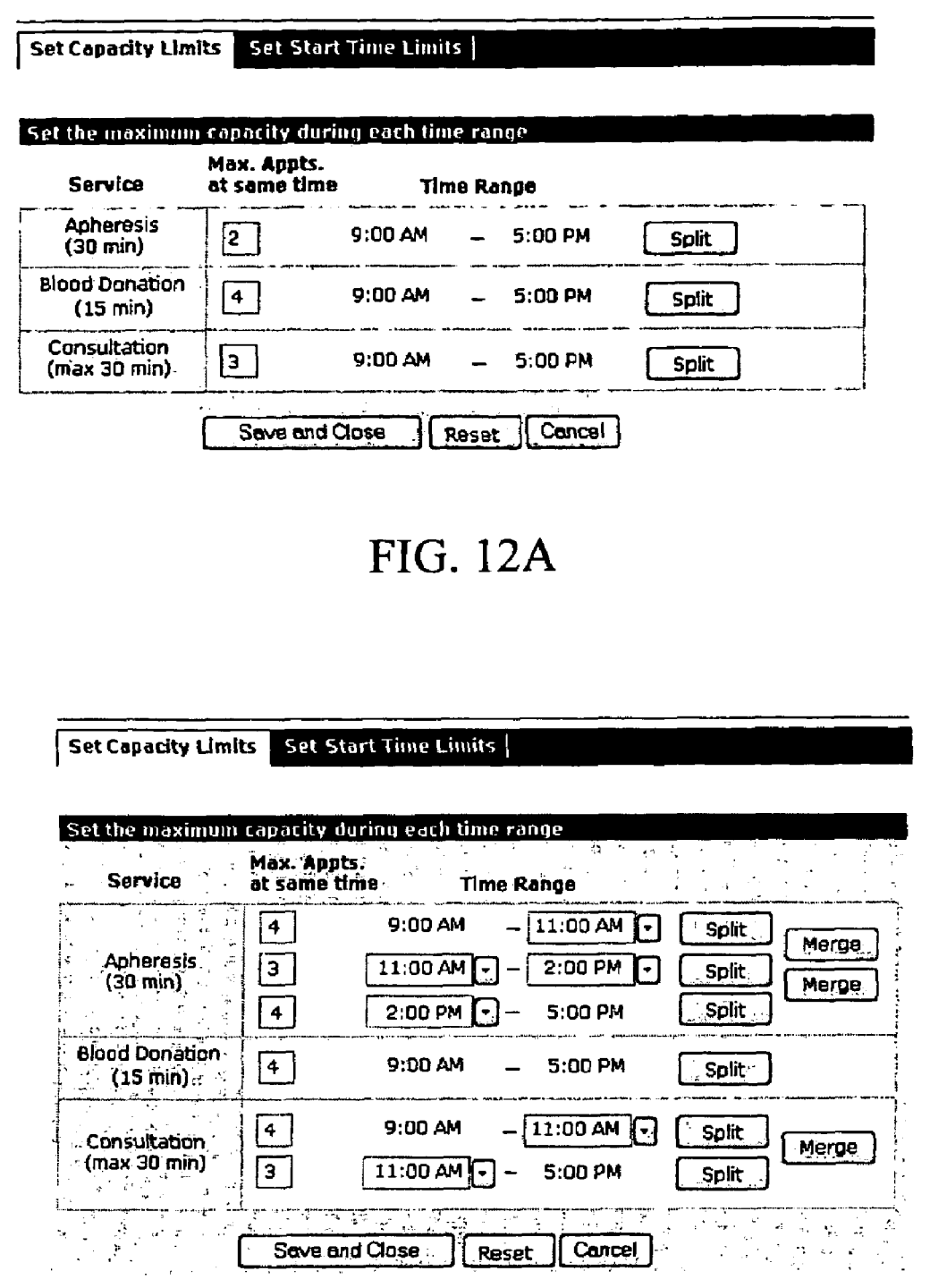

FIGS. 12A and 12B illustrate how the total capacity data structure can be modified through the user interface. In FIG. 12A, each of the three services indicated (apheresis, blood donation and consultation) are offered from 9:00 a.m.-5:00 p.m. and the maximum capacity for each at any given time is indicated. FIG. 12B shows how the maximum capacity change is represented if it varies during different time periods. For example, apheresis has been modified such that from 9:00 a.m.-11:00 a.m., the maximum capacity of concurrently occurring appointments is four while the same maximum capacity exists for the time period 2:00 p.m.-5:00 p.m. However, from 11:00 a.m. to 2:00 p.m., the maximum appointments which can occur concurrently is three.

FIG. 13 is a graphical representation of the start time capacity data structure for three different services, one for apheresis, one for blood donation and one for consultation. FIG. 13 is also a graphical representation of the maximum capacity data structure, on the far right hand column of FIG. 13.

It should be noted, of course, that the graphical representations set out in FIGS. 6A-13 are but illustrative examples only, and other, additional, or different graphical representations can be provided by user interface 204, as desired.

It can thus be seen that the present invention provides resource scheduling based on capacity. In one illustrative embodiment, the resource scheduling is based on not only a maximum total capacity over a given time period, but also a number of appointments which can be started at any given time.

In a further embodiment, these maximum capacities are represented by different data structures in a scheduling database which are updated as appointments are scheduled. In yet a further embodiment, one of the structures is updated so that it represents both maximum capacity and start time capacities to allow efficiency in searching for open appointment times and scheduling requested appointments.

Although the present invention has been described with reference to particular embodiments, workers skilled in the art will recognize that changes may be made in form and detail without departing from the spirit and scope of the invention.

What is claimed is:

1. A computer-implemented scheduling system, comprising:
    a processor;
    a data store storing (1) capacity data indicative of total capacity and start time capacity for each of a plurality of appointment types, wherein the data store stores the capacity data as a plurality of total capacity data structures and a plurality of start time capacity data structures, each total capacity data structure and start time capacity data structure corresponding to one of the plurality of appointment types, and (2) resource data indicative of resources that support each of the plurality of appointment types;
    wherein each total capacity data structure includes a total remaining capacity indicator indicative of a total number of appointments of the corresponding appointment type that can be scheduled during a given time period to remain within the total remaining capacity for the corresponding appointment type at the given time period based at least on the resource data;
    wherein each start time capacity data structure includes a plurality of substructures, one substructure corresponding to each allowed start time for the corresponding appointment type, and wherein each substructure includes a start time capacity indicator indicative of a remaining start time capacity comprising a number of appointments of the corresponding appointment type that are allowed to start at a start time represented by the corresponding substructure based at least on the resource data;
    a scheduler engine operable to:
        receive requests to schedule appointments of the plurality of appointment types;
        schedule the requested appointments based on the total remaining capacity indicators and start time capacity indicators for the corresponding appointment types of the requested appointments;
        update the capacity data based on the scheduled appointments, wherein updating the capacity data comprises updating the total capacity data structures and the start time capacity data structures so as to account for the scheduled appointments;
        wherein updating the total capacity data structures comprises updating the total remaining capacity indicators for the appointment types of the scheduled appointments over different time periods as appointments are scheduled during the different time periods; and
        wherein updating the start time capacity data structures comprises updating each of the substructures for the appointment types of the scheduled appointments to represent possible appointment durations for appointments scheduled to begin at start times corresponding to the substructures by truncating durations of the substructures beginning at a time period for which the total remaining capacity indicator indicates that there is no total remaining capacity.

2. The system of claim 1, wherein the plurality of total capacity data structures are each represented in the data store so as to include a representation of a total capacity limit updated over a plurality of different time periods as concurrent appointments are scheduled during the plurality of different time periods.

3. The system of claim 2, wherein said representation of the total capacity limit is updated over the plurality of different time periods such that not all of the different time periods are assigned the same total capacity value.

4. The system of claim 1, wherein each start time capacity data structure includes a separate start time capacity indicator for each substructure.

5. The system of claim 4, wherein not all of the separate start time capacity indicators are assigned the same start time capacity value.

6. A computer-implemented scheduling method, comprising:
    storing, on a data store, (1) capacity data indicative of total capacity and start time capacity for each of a plurality of appointment types, wherein the data store stores the capacity data as a plurality of total capacity data structures and a plurality of start time capacity data structures, each total capacity data structure and start time capacity data structure corresponding to one of the plurality of appointment types, and (2) resource data indicative of resources that support each of the plurality of appointment types;
    wherein each total capacity data structure includes a total remaining capacity indicator indicative of a total number of appointments of the corresponding appointment type that can be scheduled during a given time period to remain within the total remaining capacity for the corresponding appointment type at the given time period based at least on the resource data;
    wherein each start time capacity data structure includes a plurality of substructures, one substructure corresponding to each allowed start time for the corresponding appointment type, and wherein each substructure includes a start time capacity indicator indicative of a remaining start time capacity comprising a number of appointments of the corresponding appointment type that are allowed to start at a start time represented by the corresponding substructure based at least on the resource data;
    receiving, by a processor, requests to schedule appointments of the plurality of appointment types;
    scheduling, by a processor, the requested appointments based on the total remaining capacity indicators and start time capacity indicators for the corresponding appointment types of the requested appointments; and
    updating, by a processor, the capacity data based on the scheduled appointments, wherein updating the capacity data comprises updating the total capacity data structures and the start time capacity data structures so as to account for the scheduled appointments, wherein updating the total capacity data structures comprises updating the total remaining capacity indicators for the appointment types of the scheduled appointments over different time periods as appointments are scheduled during the different time periods, and wherein updating the start time capacity data structures comprises updating each of the substructures for the appointment types of the scheduled appointments to represent possible appointment durations for appointments scheduled to begin at start times corresponding to the substructures by truncating durations of the substructures beginning at a time period for which the total remaining capacity indicator indicates that there is no total remaining capacity.

7. The method of claim 6, wherein the plurality of total capacity data structures are each represented in the data store so as to include a representation of a total capacity limit updated over a plurality of different time periods as concurrent appointments are scheduled during the plurality of different time periods.

8. The method of claim 7, wherein said representation of the total capacity limit is updated over the plurality of different time periods such that not all of the different time periods are assigned the same total capacity value.

9. The method of claim 6, wherein each start time capacity data structure includes a separate start time capacity indicator for each substructure.

10. The method of claim 9, wherein not all of the separate start time capacity indicators are assigned the same start time capacity value.

\* \* \* \* \*